United States Patent
Kurashina et al.

(10) Patent No.: US 7,242,440 B2
(45) Date of Patent: Jul. 10, 2007

(54) ELECTRO-OPTICAL DEVICE AND ELECTRONIC APPARATUS HAVING COATING MEMBER COATING AN INNER SIDE WALL OF A CONTACT HOLE

(75) Inventors: Hisaki Kurashina, Matsumoto (JP); Yasuji Yamasaki, Chino (JP); Hidenori Kawata, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

(21) Appl. No.: 10/686,704

(22) Filed: Oct. 17, 2003

(65) Prior Publication Data

US 2004/0135952 A1 Jul. 15, 2004

(30) Foreign Application Priority Data

Oct. 31, 2002 (JP) ............................. 2002-318545
Sep. 12, 2003 (JP) ............................. 2003-321787

(51) Int. Cl.
G02F 1/1343 (2006.01)
G02F 1/1333 (2006.01)

(52) U.S. Cl. ......................... 349/44; 349/39; 349/111; 349/138

(58) Field of Classification Search ................ 349/44, 349/110, 139, 143, 138, 43, 111; 345/80
See application file for complete search history.

(56) References Cited

U.S. PATENT DOCUMENTS 5,429,962 A * 7/1995 Yang ........................... 438/30
6,396,470 B1 * 5/2002 Zhang et al. ................. 345/87
6,521,913 B1    2/2003 Murade
6,597,413 B2    7/2003 Kurashina
6,708,405 B2    3/2004 Hasler et al.
6,765,230 B2    7/2004 Murade
6,768,522 B2 * 7/2004 Yasukawa et al. ............ 349/43
6,770,909 B2    8/2004 Murade
6,806,932 B2 * 10/2004 Matsushima ................ 349/122
6,850,292 B1    2/2005 Murade
6,861,670 B1    3/2005 Ohtani et al.
6,872,975 B2    3/2005 Murade
2002/0018278 A1 * 2/2002 Sato ........................... 359/245
2002/0057403 A1 * 5/2002 Yasukawa et al. .......... 349/110
2002/0075421 A1    6/2002 Wu
2003/0202267 A1 * 10/2003 Yamasaki et al. ........... 359/883

FOREIGN PATENT DOCUMENTS

CN        1341960 A      3/2002

(Continued)

*Primary Examiner*—Andrew Schechter
(74) *Attorney, Agent, or Firm*—Oliff & Berridge, PLC

(57) ABSTRACT

An electro-optical device includes, above a substrate: a data line extending in a first direction; a scanning line extending in a second direction and intersecting the data line; pixel electrode and thin film transistor disposed so as to correspond to intersection regions of the data line and the scanning line; a storage capacitor electrically connected to the thin film transistor and the pixel electrode; a shielding layer disposed between the data line and the pixel electrode; an interlayer insulating film disposed as the base of the pixel electrode; and a contact hole formed in the interlayer insulating film, to electrically connect the thin film transistor to the pixel electrode. Further, the entire region inside the contact hole is filled with a filler.

14 Claims, 19 Drawing Sheets

FOREIGN PATENT DOCUMENTS

| | | |
|---|---|---|
| JP | A 08-262494 | 10/1996 |
| JP | A 08-338998 | 12/1996 |
| JP | A 09-043639 | 2/1997 |
| JP | A 10-325964 | 12/1998 |
| JP | A-11-125831 | 5/1999 |
| JP | A 11-212115 | 8/1999 |
| JP | A-2000-349301 | 12/2000 |
| JP | A-2001-014477 | 1/2001 |
| JP | A-2001-100247 | 4/2001 |
| JP | A-2001-265253 | 9/2001 |
| JP | A 2001-331125 | 11/2001 |
| JP | A-2001-356709 | 12/2001 |
| JP | A 2002-072925 | 3/2002 |
| JP | A-2002-131778 | 5/2002 |
| JP | A 2002-156652 | 5/2002 |
| JP | A-2002-158360 | 5/2002 |
| JP | A 2002-215066 | 7/2002 |
| JP | A-2002-244155 | 8/2002 |
| KR | 2001-0033465 | 4/2001 |
| KR | 2001-0041412 | 5/2001 |
| TW | 466773 | 12/2001 |
| WO | WO 01/82273 A1 | 11/2001 |

\* cited by examiner

ELECTRO-OPTICAL DEVICE AND ELECTRONIC APPARATUS HAVING COATING MEMBER COATING AN INNER SIDE WALL OF A CONTACT HOLE

BACKGROUND OF THE INVENTION

1. Field of Invention

The present invention relates to electro-optical devices, such as liquid crystal devices and electronic apparatuses. The present invention also relates to an electrophoresis device, such as an electronic paper, an EL (electroluminescent) device, and a device using an electron emission element (a field emission display and a surface-conduction electron-emitter display).

2. Description of Related Art

In the related art, an electro-optical device, such as a liquid crystal device capable of displaying an image, in which an electro-optical material, such as liquid crystal is interposed between a pair of substrates and light is transmitted so as to pass through the substrates and the electro-optical material, is disclosed. Displaying the image for example, is realized by changing the state of an electro-optical material in each pixel to change the transmittance ratio of light and by causing light with different gray scale levels to be sensed in each pixel.

Such an electro-optical device is active-matrix driven by including, on one of the pair of substrates, pixel electrodes arranged in a matrix, scanning lines and data lines positioned to thread through the pixel electrodes, and TFTs (thin film transistors) as pixel switching elements. According to the electro-optical device capable of being active matrix driven, the TFTs are provided to control conduction between the pixel electrodes and the data lines. The TFTs are electrically connected to the scanning lines and the data lines. Therefore, it is possible to control the turning on and off of the TFTs through the scanning lines and to apply image signals received through the data lines to the pixel electrodes, that is, to change the transmittance ratio of light in each pixel when the TFTs are turned on.

According to the above-mentioned electro-optical device, the above-mentioned various components are formed on one substrate. However, when the components are expanded two-dimensionally, the components occupy a large area. Therefore, a pixel aperture ratio, that is, a ratio of a region through which light passes to the entire surface of the substrate may decrease. Therefore, according to the related art, a method of forming the above-mentioned various components three-dimensionally, that is, a method of laminating the various components by interposing interlayer insulating layers is adopted. More specifically, the TFTs and the scanning lines functioning as gate electrode films of the TFTs are formed on the substrate. The data lines are formed on the TFTs and the scanning lines. The pixel electrodes are formed on the data lines. According to such a construction, it is possible to improve the pixel aperture ratio by appropriately arranging the various components as well as to miniaturize the electro-optical device.

At this time, the interlayer insulating films made of, for example, a silicon oxide film are formed among the above-mentioned various components so as to prevent the generation of electric short circuit among these components. Further, contact holes are formed in predetermined places of the interlayer insulating films because, for example, the drains of the TFTs must be electrically connected to the pixel electrodes and because other specific components must be electrically connected to each other. Dry etching the interlayer insulating films commonly forms the contact holes.

However, the electro-optical device having such a structure has the following problems. In general, according to the electro-optical device, it is necessary not to disturb the alignment state of the electro-optical material, such as the liquid crystal. However, according to the electro-optical device having the above-mentioned laminated structure, it is difficult to meet such a requirement. When the alignment state of the liquid crystal is disturbed, the quality of an image may deteriorate. For example, when an image, in which an entire surface is blacked, is desired to be displayed, light leakage occurs in the disturbed portion, thereby deteriorating contrast. Further, a layer contacting the liquid crystal is preferably as flat as possible in order not to disturb the liquid crystal.

Such problems occur due to the following reasons. First, the layer contacting the liquid crystal must be at the uppermost layer in the laminated structure. That is, the uppermost layer is preferably flat in order not to disturb the alignment state of the liquid crystal. However, in a case where the laminated structure is formed after the above-mentioned various components are formed, the heights of the components are different from each other. Therefore, in general, the step differences caused by the heights, overlap with each other and affect each other, toward upper layers. As a result, a complicated concavo-convex is caused in the uppermost layer. When the concavo-convex is generated, the alignment state of the liquid crystal may be disturbed in response thereto. Therefore, it is difficult to maintain the alignment state as a predetermined state. Furthermore, the deterioration of the flatness due to the above-mentioned reasons becomes more serious in response to the complexity of the structure of the electro-optical device.

Second, the contact holes formed in the interlayer insulating films also deteriorate the flatness. For example, when an alignment film is formed in the uppermost layer and also the contact holes are formed under the alignment film in the above-mentioned laminated structure, concave portions corresponding to the positions, where the contact holes are formed, are formed on the alignment film. This is because the contact hole has a hollow inside as noted from the name.

On the other hand, the light leakage mentioned as an example of the deterioration of the quality of an image may occur because the flatness of the laminated structure is not met and the contact holes themselves exist. This is because the contact hole has the hollow inside as mentioned above, thereby easily transmitting light. That is, light passing through the hollow of the contact hole is mixed with the image and then may deteriorate the quality of the image.

SUMMARY OF THE INVENTION

Accordingly, in order to address the above-mentioned problems, the present invention provides an electro-optical device and an electronic apparatus capable of displaying an image with excellent quality by maintaining the flatness of a laminated structure on a substrate to the maximum and also reducing or preventing light leakage caused by contact holes formed in the laminated structure.

In order to achieve the above objects, the electro-optical device according to the present invention includes, above a substrate, a data line extending in a first direction; a scanning line extending in a second direction and intersecting the data line; a pixel electrode and thin film transistor disposed so as to correspond to intersection regions of the data line and the scanning line; a storage capacitor electrically connected to the thin film transistor and the pixel electrode; a shielding layer disposed between the data line and the pixel electrode; an interlayer insulating film disposed as the base of the pixel electrode; and a contact hole formed in the interlayer insulating film, to electrically connect the thin film transistor to the pixel electrode, the entire region inside the contact hole being filled with a filler.

The electro-optical device of the present invention can be driven in an active matrix by including the scanning lines, the data lines, the pixel electrodes, and the thin film transistors. Furthermore, in the above electro-optical device, it is possible to achieve miniaturization of the whole apparatus by including the aforementioned various constituents as some portions of the laminated structure, and it is possible to enhance the pixel aperture ratio by arranging the various constituents appropriately.

Moreover, in the present invention, other than the aforementioned various constituents, particularly the storage capacitors, the shielding layers, and the interlayer insulating films are provided as the constituents of the laminated structure. First, provision of storage capacitors enables the present invention to enhance a potential holding property of the pixel electrodes. By doing so, it is possible to display images with high contrast.

Second, provision of shielding layers between the data lines and the pixel electrodes enables the present invention to reduce or prevent the occurrence of capacitance couplings between the data lines and the pixel electrodes in advance. Namely, the electrical conduction of the data lines enables reduction of the probability of the occurrence of potential variation in the pixel electrodes, and thus, it is possible to display images with higher quality.

Third, according to the present invention, in particular, the contact holes to electrically connect the thin film transistors to the pixel electrodes are included in the interlayer insulating films under the pixel electrodes. Further, the filler is included in the entire region inside the contact holes.

Therefore, it is possible to realize excellent electric connection between the thin film transistors and the pixel electrodes and also to realize excellent and firm electric connection compared with the related art due to the presence of the filler. This is because the fillers exist in contact portions between the contact holes and the thin film transistors or between the contact holes and the pixel electrodes thereby to increase the contact area of both members in the contact portions and to reduce the resistance value of the contact area.

Also, according to the present invention, in particular, it is possible to obtain the following effects due to the presence of the filler. That is, due to the presence of the filler, it is possible to reduce or prevent the inside of the contact holes from being hollow like in the related art. Therefore, a concave portion is not formed in the laminated structure formed on the contact holes. Thus, for example, even in case where the alignment film is formed on the pixel electrodes, the concave portion is not formed in the alignment film and then the alignment state of the liquid crystal touched with the alignment film is not disturbed. As a result, for example, it is possible to reduce or prevent the quality of an image from deteriorating due to the reduction of a contrast ratio to the maximum. Also, as a principle, light that transmits the hollow like in the related art does not exist. This is because the 'hollow' does not exist due to the presence of the filler. As a result, it is possible to reduce or prevent the deterioration of the quality of the image.

Also, the filler is preferably made of a light-shielding material and a transparent conductive material according to the following various aspects of the present invention. However, the present invention is not limited to the specific aspect of the filler. That is, the contact holes may be filled with any materials. Therefore, it is possible to use all kinds of metal materials as the "filler" according to the present invention.

Also, in the present invention, according to circumstances, the entire region inside a contact hole formed in an interlayer insulating film other than the interlayer insulating films arranged as the base of the pixel electrodes, that is, an interlayer insulating film positioned in a deeper portion may be filled with the filler. According to the above-mentioned structure, it is also possible to prevent the generation of the concave portion on the alignment film.

Furthermore, the "electric connection" according to the present invention includes a case where another element, such as a storage capacitor, is interposed between the contact hole and the thin film transistor and the contact hole is "connected" to the thin film transistor, as well as a case where the thin film transistor is directly "connected" to the pixel electrode through the contact hole. In this case, it is assumed that the contact holes exist between the thin film transistor and the storage capacitor and between the storage capacitor and the pixel electrode. In this case, the contact hole according to the present invention refers to the latter contact hole because it is formed in "the interlayer insulating film arranged as the base of the pixel electrode".

According to one aspect of the electro-optical device of the present invention, the surface of the interlayer insulating films is planarized.

According to this aspect, the surface of the interlayer insulating films is planarized by the planarization process. Therefore, it is possible to reduce or prevent the generation of the step difference and the concave portion in the pixel electrode and the alignment film. Furthermore, it is possible to further enhance such an effect in that complicated unevenness is formed on the surface of the upper most interlayer insulating film because the electro-optical device according to the present invention includes the scanning lines, the data lines, the thin film transistors, the storage capacitor, and the shielding layer and thus, the structure thereof is further complicated. According to the present invention, in particular, because the contact hole is filled with the filler, the filler protrudes from the surface of the interlayer insulating films and a convex portion is formed instead of the concave portion generated in the related art. However, according to the present aspect, although the protrusion and the convex portion exist, it is possible to planarize them.

Furthermore, in particular, for example, a CMP (chemical mechanical polishing) process and an etch back process are used for "the planarization process" according to the present invention. However, other various planarization processes may be used.

In the CMP process, in general, the surface of a substrate to be coated is abraded by mechanical and chemical processes by connecting the surface of the substrate to be coated to the surface of an abrasive cloth (pad) while rotating the substrate to be coated and the abrasive cloth and also by supplying an abrasive solution (slurry) including silica particles to the connection portion between the coating process substrate and the abrasive cloth. As a result, the surface of the substrate to be coated is planarized.

In the etch back process, after forming a flat film, such as a photoresist film and a SOG (spin on glass) film on the uneven surface as a sacrificial film, the sacrificial film is etched to the uneven surface (Therefore, the uneven surface is "planarized"). The etchback process is a technology for planarizing the surface. According to the present invention, the sacrificial film is not essential. For example, after excessively forming a film made of the filler so as to overflow from the contact hole to the surface of the interlayer insulating films to an extent of more than filling the space inside the contact hole, the excessively formed portion is completely etched in a region excluding the contact hole. Therefore, the filler exists only inside the contact hole and the flat surface is formed.

In addition, in accordance with the construction that the surface of the interlayer insulating films is planarized, similar to the aforementioned present invention, in a case that every scanning line or every row of the pixel electrodes which are connected to the scanning lines being driven by the different polarities (that is, the "1H inversion driving"; see the later description), since the transverse electric field may occur between the adjacent pixel electrodes, disorder of the alignment state of the electro-optical device such as liquid crystal may occur. In this point, as described below, although suppressing the occurrence of the transverse electric field by providing convex portions to the surface of the interlayer insulating films is preferable, the other device may be preferably employed as follows.

Namely, the inversion of the polarity may be performed not for every scanning line but for every one field period (one vertical scanning period). In other words, the "1V inversion driving" is performed. By doing so, since the adjacent pixel electrodes are not driven by the different polarities during any field period, the transverse electric field cannot occur in principle.

However, if the 1V inversion driving is employed, the following problems occur. Namely, one of the difficult problems is that the flicker may occur on the image for every one vertical scanning period at the time of inversion of the polarity.

Therefore, in these cases, as described later in details in exemplary embodiments, the multiplication-speed field inversion driving is preferable. Herein, the multiplication-speed field inversion driving is a driving manner in which the one field period is shortened by half in comparison to the related art period (for example, assuming that the related art period is driven at 120 [Hz], the "half" is preferably ¹⁄₆₀ [s] or less). Therefore, in a case of the 1V inversion driving, the period of the inversion of the polarity is a half of the related art period. By doing so, the one vertical scanning period is shortened. In other words, the changeover between the screen corresponding to the positive polarity and the screen corresponding to the negative polarity is further rapidly carried out, so that the aforementioned flicker cannot be perceived by human eyes.

Like this, in accordance with the multiplication-speed field inversion driving manner, it is possible to display images with higher quality without flicker.

According to another aspect of the electro-optical device according to the present invention, another contact holes are formed in another interlayer insulating films. Therefore, the entire region inside the contact holes is filled with the filler.

According to such aspect, another contact hole is formed in another interlayer insulating films. Therefore, the entire region inside the contact holes is filled with the filler. Here, as another contact hole, for example, the contact hole is one for electrically connecting the storage capacitor to the shielding layer.

The above-mentioned effect can be further surely obtained because a part or the entire part of the contact holes formed in the interlayer insulating films is filled with the filler.

According to another aspect of the electro-optical device of the present invention, the filler is made of the light-shielding material.

According to such aspect, because the filler is made of the light-shielding material, it is possible to further reliably reduce or prevent the light leakage caused by the presence of the contact hole. That is, because the progress of light is prevented by the filler, it is possible to substantially reduce or prevent light that transmits the contact hole whose inside is hollow from being incident on an image like in the related art. Therefore, it is possible to reduce or prevent light from being incident on an image and thereby to display an image with excellent quality.

According to the present aspect, because the filler intercepts light, it is possible to reduce or prevent light from being incident on the semiconductor layer that forms the thin film transistor, in particular, the channel region. Therefore, it is possible to reduce or prevent the generation of light leakage current and thereby to display an image with excellent quality without flicker on the image.

The "light-shielding material" according to the present aspect includes a metal monomer including at least one among for example, Ti (Titanium), Cr (Chrome), W (Tungsten), Ta (Tantalum), and Mo (Molybdenum), an alloy, metal silicide, poly silicide, and a laminated material formed of the above materials.

According to another aspect of the electro-optical device of the present invention, the filler is made of a transparent conductive material.

According to such aspect, it is possible to form the filler made of the same material as that of the pixel electrode. This is because the pixel electrode is made of the transparent conductive material, such as ITO (Indium Tin Oxide) and IZO (Indium Zinc Oxide). Therefore, according to the present aspect, it is possible to perform a processes of forming or film forming the pixel electrode and a process of filling the inside of the contact hole with the filler at the same time and thereby to reduce the manufacturing cost of the pixel electrode and the filler.

In this case, because the length of the contact hole is generally larger than the thickness of the pixel electrode disposed as a part of the uppermost layer, although the filler is made of the transparent conductive material, the filler is expected to have a light-shielding effect. That is, the thicker the filler is, the smaller transparency is. Therefore, it is difficult for light to transmit the filler. Therefore, according to the present aspect, it is possible to obtain the effect of preventing light leakage in the contact hole although the effect of preventing light leakage may be weaker than that obtained when the filler is made of the above-mentioned light-shielding material.

According to another aspect of the electro-optical device of the present invention, a coating member is formed in the inner surface of the contact hole. Therefore, the filler is formed on the coating member.

According to such aspect, a two-layer structure, that is, the coating member and the filler (an "inner layer (the filler)" and an "outer layer (the coating member)") is formed inside the contact hole. Therefore, for example, it is possible to use a material with a higher conductivity for the coating member and to use a material with a higher light-shielding performance for the filler. As a result, it is possible to obtain the above-mentioned various effects. Also, it is possible to appropriately decide which effects are to be considered as important among the above-mentioned various effects, for example, the light-shielding effect.

According to such aspect, in particular, the filler is made of a polyimide material.

According to this structure, it is possible to simplify manufacturing processes as in the case of forming the filler of the conductive material since the alignment film is made of the polyimide material on the pixel electrode, that is, to perform the process of forming the alignment film and the process of forming the filler at the same time. As a result, it is possible to reduce the manufacturing cost of the alignment film and the filler.

Also, according to the present aspect, unlike the above-mentioned aspect, the filler is not made of the conductive material. However, it is possible to realize electric connection between the thin film transistors and the pixel electrodes as long as the coating member, according to the present aspect, is made of the conductive material. In this case, the filler is not necessarily made of the conductive material. To be specific, according to the present aspect, the filler is made of the polyimide material. However, the filler may be filled of an insulating material such as an oxide and a nitride instead of the polyimide material.

According to another aspect of the electro-optical device of the present invention, the contact hole is formed in light-shielding regions corresponding to the positions where the scanning lines and the data lines are formed.

According to such aspect, because the contact holes are formed in the light-shielding regions, it is possible to enhance an aperture ratio. Also, because a light-shielding film as well as the scanning lines and the data lines can be formed in the light-shielding regions, it is possible to reduce the amount of light that reaches the contact hole. Therefore, according to the present aspect, it is possible to substantially prevent the light leakage caused by the contact hole and to obtain the various effects of the filler according to the present invention. As a result, it is possible to display an image with excellent quality.

In another aspect of the electro-optical device according to the present invention, each of the data lines is formed of the same film as one of a pair of electrodes, which constitute each of the storage capacitors.

According to the above aspect, each data line and one electrode in a pair of electrodes, which constitute each of the storage capacitors, are made of the same film, in other words, formed on the same layer, or formed in the same manufacturing process. By doing so, it is not necessary to provide both of each of the data lines and one electrode on separate layers and to separate them by interlayer insulating films. Thus, it is possible to avoid a highly laminated structure. At this point, the present invention is advantageous in that the laminated structure includes the shielding layers formed between the data lines and the pixel electrodes, and thus, a highly laminated structure that has an altitude increase is expected. The reason for such an advantage is that, excessively multi-layered structure obstructs easy manufacturing or high manufacturing yield. In addition, even though the data lines and the one electrode of a pair of the electrodes are formed at the same time, by an appropriate patterning process on the aforementioned films, it is possible to facilitate the insulation between them, and no particular problem occurs with respect to this point.

In addition, conversely, as apparent from the description of the aspect, in the present invention, it is not always necessary to form each of the data lines and the one electrode of a pair of electrodes which constitute each of the storage capacitor as the same film. In other words, they may be separately formed in the different layers.

Furthermore, according to the above aspect, it is preferable that the data lines include a laminated body of an aluminum film and a conductive polysilicon film.

According to the above configuration, it is possible to implement electrical connection between the data lines and the thin film transistors and contact between the conductive polysilicon film that constitute the data lines and the semiconductor layers which constitute the thin film transistors, so that a good electrical connection between them can be obtained.

In another aspect of the electro-optical device according to the present invention, the electro-optical device further includes relay layers, as parts of a laminated structure, to electrically connect each of the pixel electrodes to one of a pair of electrodes that constitute each of the storage capacitors.

According to the above aspect, the one electrode of a pair of electrodes of each of the storage capacitor and the pixel electrodes that constitute some portions of the laminated structure, respectively, are electrically connected to the relay layer that constitutes some portions of the laminated structure. By doing so, for example, the relay layers according to the present invention are formed of a two-layered structure, while the upper layer is made of a material which is very compatible with ITO (Indium Tin Oxide) as an example of a transparent conductive material which is generally used as a material of the pixel electrode and the lower layer is made of a material which is compatible with one electrode of a pair of electrodes which constitute each of the storage capacitor. Like this, since the relay layer can employ such a flexible construction, it is possible to further suitably implement the application of voltage to the pixel electrodes or the potential holding in the pixel electrodes. Further, in this case, contact holes according to the present invention are for connecting the relay layer to the pixel electrodes.

In another aspect of the electro-optical device of the present invention, a plurality of the pixel electrodes are arranged in a plane and include a first pixel electrode group which is inversely driven at a first period and a second pixel electrode group which is inversely driven at a second period which is complementary to the first period. The data lines include main line portions which are extended to upper sides of the scanning lines so as to intersect the scanning lines and overhanging portions which overhang along the scanning lines. The electro-optical device further includes a counter electrode which faces the plurality of the pixel electrodes on a counter substrate which is provided opposite to the substrate, and convex portions are formed on base surfaces of the pixel electrodes on the substrate, the convex portions being regions to be gaps between the pixel electrodes, which are adjacent to each other by interposing the scanning lines in plan view, corresponding to the overhanging portions.

According to the above aspect, a plurality of pixel electrodes are arranged on the first substrate in a plane and include a first pixel electrode group which is inversely driven at the first period and a second pixel electrode group which is inversely driven at the second period, which is complementary to the first period. Both types of pixel electrodes exist; (1) pixel electrodes which are driven by the driving voltages with opposite polarities every time during the inversion driving and are adjacent to each other, and (2) pixel electrodes which are driven by the driving voltages with the same polarities every time during the inversion driving and are adjacent to each other. Both of the types exist in case of the electro-optical device, such as matrix driven liquid crystal apparatus that employs, for example, the aforementioned 1H inversion driving manner. Therefore, the transverse electric field is generated between the adjacent pixel electrodes that belong to the different pixel electrode groups, that is, those to which a reverse polarity potential is applied.

Herein, in the present invention, particularly, the data lines include the overhanging portions along the scanning lines from the main line portions which extend above the scanning lines to intersect with the scanning lines. In addition, at the presence of the overhanging portions, convex portions are formed in the regions to be gaps between the pixel electrodes which are adjacent by interposing the scanning lines in plan view on the base surface of the pixel electrodes. Namely, the base surfaces of the pixel electrodes become surfaces on which convex portions having constructively predetermined height and predetermined shape are formed.

As a result, first, if the edge portions of each pixel electrode are formed to be located on the convex portions, it is possible to relatively strengthen the longitudinal electric field generated between each pixel electrode and each counter electrode in comparison with the transverse electric field generated between the adjacent pixel electrodes, particularly, between the pixel electrodes which belong to the different pixel electrode groups. In other words, since in general, the electric field is getting stronger as the distance between the electrodes is getting shorter, the edge portions of the pixel electrode is closer to the counter electrode by the distance corresponding to the height of the convex portions, so that the longitudinal electric field generated between the electrodes can be strengthened. Second, irrespective of whether the edge portions of each pixel electrode are located on the convex portions or not, the transverse electric field generated between the adjacent pixel electrodes, particularly, between the pixel electrodes which belong to the different pixel electrode groups becomes smaller by the presence of the prominence in accordance with the dielectric constant of the convex portions, and also by reduction in the volume of the electro-optical materials which the transverse electric field passes through by the partial substitution thereof at the convex portions, so that it is possible to reduce the influence of the transverse electric field to the electro-optical materials. Therefore, it is possible to reduce operational failure of the electro-optical materials, such as the alignment failure of liquid crystal due to the transverse electric field in accordance with the inversion driving manner. At this time, as described above, the edge portions of the pixel electrode may be located on the convex portions; otherwise, the edge portions may be located in the middle of the slanted or substantially vertical side surface of the convex portions.

Furthermore, it is possible to control the height or shape of the convex portions further accurately in comparison with a technique for controlling the height of the edge of the pixel electrodes by using the presence of the other wiring lines or elements which are located at the lower portion of the data lines. In the aforementioned technique, since slight discrepancies of patterns in plural films are combined, it is basically difficult to control the height or shape of the uppermost layer that is finally formed, as the desired design. For this reason, since the operational failure of the electro-optical materials, such as disorder of the liquid crystal due to the transverse electric field is surely reduced finally, it is possible to improve reliability of the apparatus.

In addition, since the light-shielding film to cover positions of operational failure in the electro-optical materials can be formed in a small size, it is possible to increase the aperture ratio of each pixel without image defects such as a light leakage.

As a result, since operational failures due to the transverse electric field in the electro-optical materials, such as liquid crystal, etc., can be surely reduced by the formation of the convex portions along the overhanging portions of the data lines, it is possible to relatively easily manufacture the electro-optical device, such as liquid crystal apparatuses with high contrast, high brightness, and high quality.

In addition, the present invention can be adapted to various types of electro-optical devices besides the projection type and reflection type ones.

In another aspect of the electro-optical device of the present invention, a plurality of the pixel electrodes are arranged in a plane and include a first pixel electrode group which is inversely driven at a first period and a second pixel electrode group which is inversely driven at a second period which is complementary to the first period, the electro-optical device further including a counter electrode which faces the plurality of the pixel electrodes on a counter substrate which is provided opposite to the substrate, and convex portions formed in regions to be gaps between the pixel electrodes which are adjacent in plan view, and the convex portions have gentle step differences which are formed by removing the planarization films which are formed in advance on the convex portions by an etching process and retreating the surfaces of the convex portions which are exposed after removing.

According to the above aspect, although the transverse electric field is generated between the adjacent pixel electrodes belonging to the different pixel electrode groups, that is, between the adjacent pixel electrodes to which potentials of opposite polarities are applied, since the convex portions are constructively formed by the etching process for the edge portions which are located at non-opening regions of each pixel electrode or the edge portions of the adjacent pixel electrodes, first, if the edge portions of each pixel electrode are formed to be located on the convex portions, it is possible to relatively strengthen the longitudinal electric field generated between each pixel electrode and each counter electrode in comparison with the transverse electric field generated between the adjacent pixel electrodes. Second, irrespective of whether the edge portions of each pixel electrode are located on the convex portions or not, the transverse electric field generated between the adjacent pixel electrodes becomes smaller by the presence of the prominence in accordance with the dielectric constant of the convex portions, and also by reduction in the volume of the electro-optical materials which the transverse electric field passes through, so that it is possible to reduce the influence of the transverse electric field to the electro-optical materials. Therefore, it is possible to reduce operational failure of the electro-optical materials such as the alignment failure of liquid crystal due to the transverse electric field in accordance with the inversion driving manner. At this time, as described above, the edge portions may be located on the convex portions, or not; otherwise, the edge portions of each pixel electrode may be located in the middle of the slanted or substantially vertical side surface of the convex portions.

In addition, since the light-shielding film to cover the positions of operational failure in the electro-optical materials can be formed in a small size, it is possible to increase the aperture ratio of each pixel without image defects such as a light leakage.

Moreover, in the present invention, particularly, since the convex portions having gentle step differences are formed, it is possible to effectively prevent the occurrence of the operational failures due to the step differences in the vicinity of the convex portions of the electro-optical materials such as the disorder of the liquid crystal in advance. In particular, in a case wherein the rubbing process is performed on the alignment films which are formed on the pixel electrodes, if the step differences of the convex portions are gentle, the rubbing process can be relatively easily performed without any non-uniformity, so that it is possible to most effectively reduce or prevent the operational failures of the electro-optical materials, such as the disorder of the liquid crystal in advance.

As a result, it is possible to surely reduce the operational failure due to the transverse electric field in the electro-optical materials, such as liquid crystal by the formation of the convex portion, and also, it is possible to suppress the occurrence of the operational failure due to the step differences in the electro-optical materials, such as liquid crystal by the gentle step differences, so that it is possible to implement electro-optical device such as liquid crystal apparatus capable of displaying images with high contrast, high brightness, and high quality.

According to another aspect of the electro-optical device of the present invention, the dielectric film that constitutes the storage capacitor is a laminated structure formed of a plurality of layers including different materials, in which one layer is made of a material having higher dielectric constant than the dielectric constants of the other layers.

According to the above-mentioned aspect, the dielectric film that constitutes the storage capacitor is a laminated structure formed of a plurality of layers including different materials, in which one layer is made of a material having higher dielectric constant than the dielectric constants of the other layers. Therefore, the storage capacitor according to the present invention has an excellent property of accumulating charges compared with the related art. As a result, it is possible to enhance the electric potential holding property of the pixel electrode and thereby to display an image with excellent quality.

Further, the 'high dielectric material' according to the present invention includes an insulating material made of at least one among TaOx (tantalum oxide), BST (barium strontium titanate), PZT (lead zirconate titanate), $TiO_2$ (Titanium dioxide), $ZiO_2$ (zirconium dioxide), $HfO_2$ (haffium dioxide), SiON (silicon oxynitride), and SiN (silicon nitride). In particular, it is possible to increase the capacitance in a limited region on a substrate by using the materials having high dielectric constant such as TaOx, BST, PZT, $TiO_2$, $ZiO_2$, and $HfO_2$. Alternatively, it is possible to reduce the amount of stress in the interlayer insulating films by using materials including silicon such as $SiO_2$ (silicon dioxide), SiON (silicon oxynitride), and SiN.

According to the various aspects of the present invention, it is possible to freely combine one aspect with another aspect. However, intrinsically, some combinations, such as the combination of the aspect where the entire region inside the contact holes is filled with the filler with the aspect where the convex portion is formed on the interlayer insulating films, are not commonly used.

Of course, the electro-optical device may be constructed by combination of three or more configurations.

In order to achieve the aforementioned object, the electronic apparatus of the present invention includes the aforementioned electro-optical device of the present invention. However, various aspects are included.

In accordance with the electronic apparatus of the present invention, since the electronic apparatus includes the electro-optical device of the present invention, it is possible to implement various types of electronic apparatuses capable of displaying images with high quality, such as a projection type display apparatus (liquid crystal projector), a liquid crystal television set, a mobile phone, an electronic diary, a word processor, a viewfinder type or monitor-direct-viewing type video tape recorder, a workstation, a television telephone, a POS terminal, a touch panel without the deterioration of the quality of the image such as the deterioration of contrast, which is caused by the contact hole.

These functions and the other advantages of the present invention will be clarified by the exemplary embodiments described below.

DETAILED DESCRIPTION OF PREFERRED EMBODIMENTS

Now, the exemplary embodiments of the present invention will be described with reference to the figures. The following exemplary embodiment is an electro-optical device according to the present invention, which is applied to a liquid crystal apparatus.

Constitution of Pixel Portion

Figure 1:
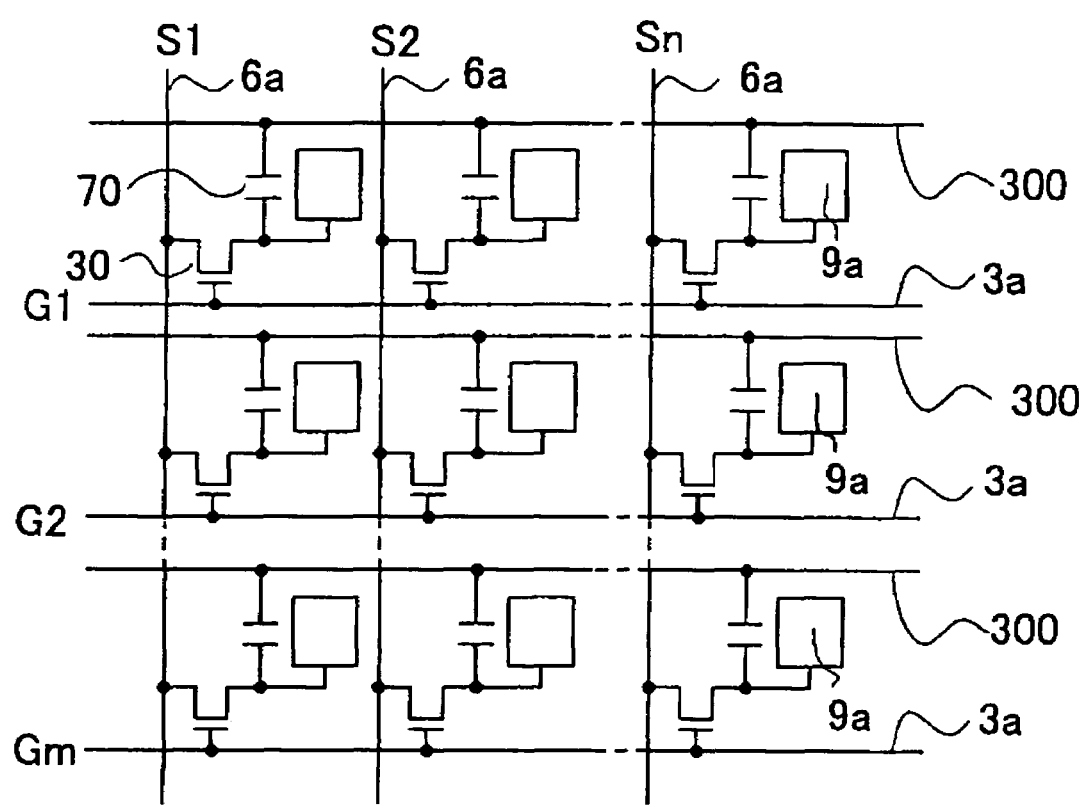
FIG. 1 is a circuit schematic illustrating an equivalent circuit of various elements and wiring lines that are provided in a plurality of pixels having a matrix shape that constitutes image display regions in an electro-optical device according to an exemplary embodiment of the present invention.
Figure 2:
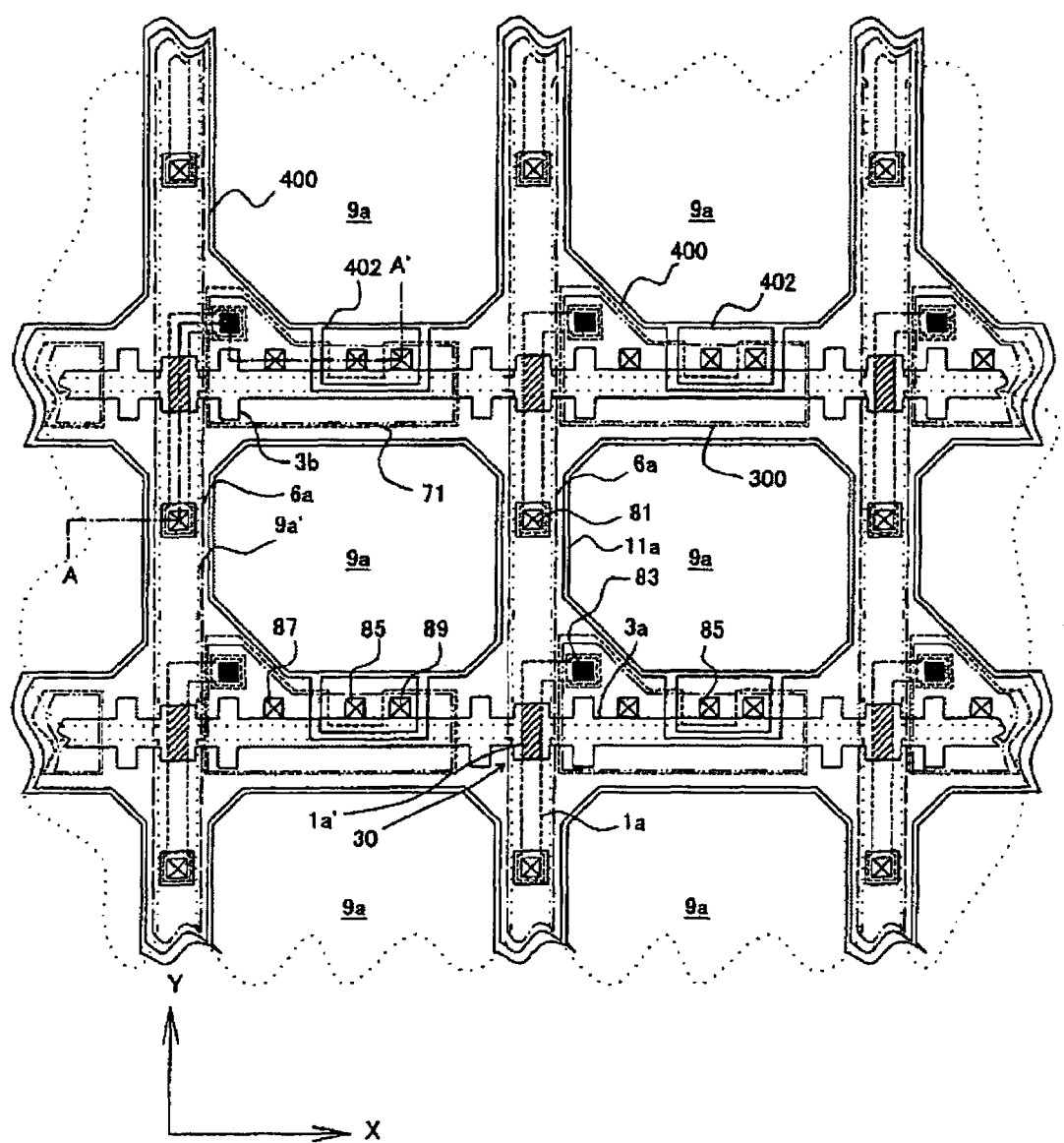
FIG. 2 is a plan view illustrating a plurality of pixel groups which are adjacent to each other on a TFT array substrate on which data lines, scanning lines, pixel electrodes, etc. are formed in the electro-optical device according to an exemplary embodiment of the present invention.
Figure 3:
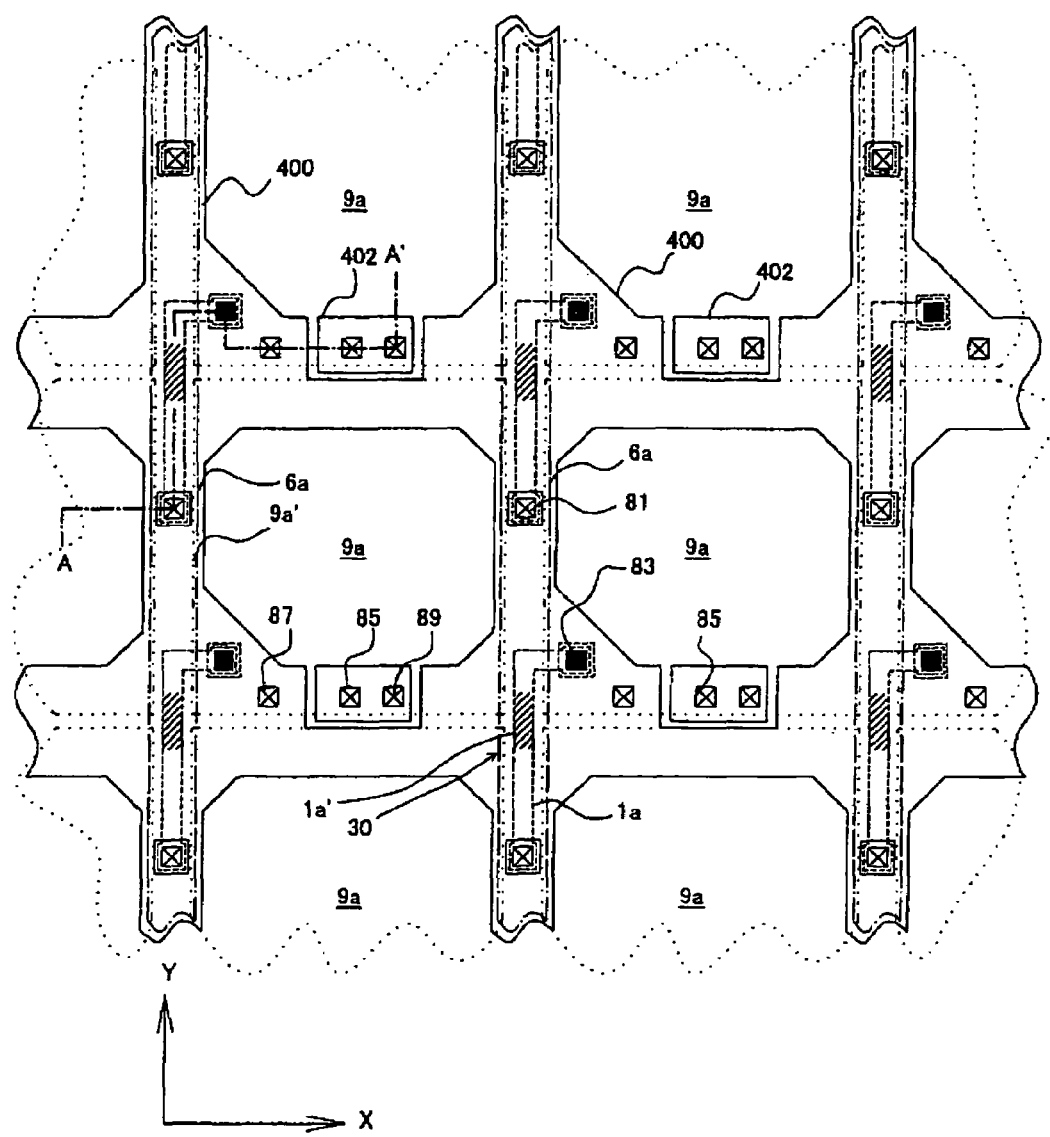
FIG. 3 is a plan view mainly illustrating the data lines, the shielding layer, and the pixel electrodes in FIG. 2 in order to illustrate the arrangement relationship among them.
Figure 4:
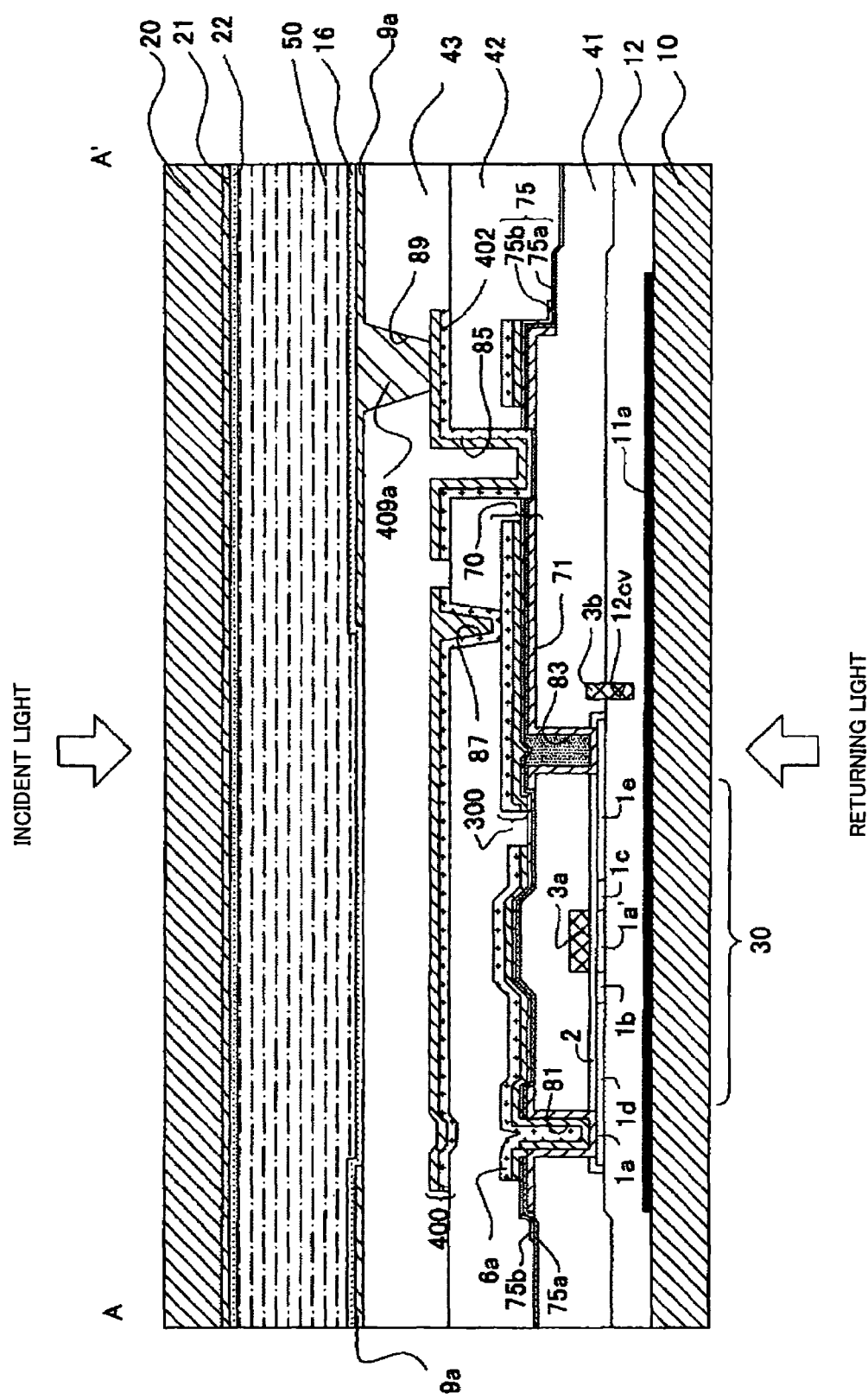
FIG. 4 is a cross-sectional view taken along the plane A-A' of FIG. 2.

First, the constitution of the electro-optical device in an exemplary embodiment of the present invention will be described with reference to FIGS. 1 to 4. Herein, FIG. 1 is a circuit schematic illustrating an equivalent circuit of various elements and wiring lines that are provided in a plurality of pixels having a matrix shape which constitutes image display regions in the electro-optical device. FIG. 2 is a plan view illustrating a plurality of pixel groups which are adjacent to each other on a TFT array substrate on which data lines, scanning lines, pixel electrodes, etc., are formed in the electro-optical device. In addition, FIG. 3 is a plan view illustrating the only principal parts extracted from FIG. 2, specifically, the arrangement of the data lines, shielding layers, and pixel electrodes. FIG. 4 is a cross sectional view along the plane A-A' in FIG. 2. In FIG. 4, each layer and each member are shown in different scales in order to make each layer and each part recognizable in the drawing.

In FIG. 1, in a plurality of the pixels which are arranged in a matrix and constitute image display regions of the electro-optical device according to the exemplary embodiment, each of pixel electrodes 9a and each of TFTs 30 to control the switching of each of the pixel electrodes 9a are formed and each of data lines 6a to which image signals are applied is electrically connected to sources of the TFTs 30. The image signals S1, S2, ..., Sn, which are written into the data lines 6a, may be line sequentially applied in this order and, otherwise, may be applied to every group of a plurality of data lines 6a adjacent to each other.

In addition, scanning lines 3a are electrically connected to gates of the TFTs 30 and scanning signals G1, G2, ..., Gm are line sequentially applied as pulses to the scanning lines 3a in this order at a predetermined timing. The pixel electrodes 9a are electrically connected to the drains of the TFTs 30 and image signals S1, S2, ..., Sn, which are applied from the data lines 6a, are written at a predetermined timing by closing the switches of the TFTs 30 which are 'switching elements' for a predetermined period.

The predetermined levels of the image signals S1, S2, ..., Sn, which are written into the liquid crystal through pixel electrodes 9a, as examples of the electro-optical materials, are held for a predetermined period between pixel electrodes and the counter electrode which is formed on the counter substrate. The liquid crystal modulates light by varying the alignment or order of molecule group in accordance with the applied voltage levels to display the gray scale. If in a normally white mode, the transmittance ratio to the incident light reduces in accordance with voltages that are applied to each pixel unit, and if in a normally black mode, the transmittance ratio to the incident light increases in accordance with voltages that are applied to each pixel unit. Totally, light having contrast according to image signals are emitted from the electro-optical device.

Herein, in order to reduce or prevent leakage of the held image signals, storage capacitors 70 are added parallel to the liquid crystal capacitances, which are formed between the pixel electrodes 9a and the counter electrode. The storage capacitors 70 are provided parallel to the scanning lines 3a and each of the storage capacitors includes a fixed-potential-side capacitor electrode and a capacitor electrode 300 which is fixed to a constant potential.

Now, the real construction of the electro-optical device to which the aforementioned circuit operation is realized by the data lines 6a, the scanning lines 3a, and the TFTs 30 will be described with reference to FIGS. 2 to 4.

First, in FIG. 2, a plurality of the pixel electrodes 9a are provided in a matrix on the TFT array substrate 10 (the contours of the pixel electrodes are represented by the dot line portions 9a') and the data lines 6a and the scanning lines 3a are provided along the perpendicular and horizontal boundaries of the pixel electrodes 9a, respectively. The data lines 6a are formed in a laminated structure including aluminum film, etc., as described later, and the scanning lines 3a are made of conductive polysilicon film. The scanning lines 3a are provided to face the channel regions 1a' which are marked by the forward slanting line regions on the drawing within the semiconductor layers 1a. The scanning lines 3a function as gate electrodes. That is, the pixel switching TFTs 30, in which the main line portions of the scanning lines 3a as the gate electrodes face the channel regions 1a', are formed in the portions where the scanning lines 3a intersect the data lines 6a.

Next, the electro-optical device includes TFT array substrate 10 and counter substrate 20 which is provided to face the TFT array substrate 10, as shown in FIG. 4, which is a cross sectional view along the plane A-A' of FIG. 2. The TFT array substrate 10 is made of, for example, a quartz substrate, a glass substrate, or a silicon substrate, and the counter substrate 20 is made of, for example, a glass substrate or a quartz substrate.

As shown in FIG. 4, the aforementioned pixel electrode 9a is provided at the TFT array substrate 10, and an alignment film 16 on which a predetermined alignment process, such as a rubbing process, is provided above the pixel electrode. The pixel electrode 9a is made of, for example, a transparent conductive film, such as an ITO film. On the other hand, the counter electrode 21 is provided over the entire surface of the counter substrate 20, and, an alignment film 22 on which a predetermined alignment process, such as a rubbing process is carried out, is provided below the counter electrode. The counter electrode 21 is made of, for example, a transparent conductive film such as an ITO film similar to the aforementioned pixel electrodes 9a, and the aforementioned alignment films 16 and 22 are made of, for example, a transparent organic film such as a polyimide film. Between the TFT array substrate 10 and the counter substrate 20, which are provided to face like this, liquid crystal layer 50 is formed by sealing electro-optical materials, such as liquid crystal, within a space which is surrounded with a sealing material which is described later (see FIGS. 19 and 20). The liquid crystal layer 50 is aligned by the alignment films 16 and 22 in a state where an electric field is not applied from the pixel electrode 9a. The liquid crystal layer 50 is made of the electro-optical material of, for example, one nematic liquid crystal or a mixture of various kinds of nematic liquid crystals. The sealing material is an adhesive agent formed of, for example, photo-curing resin or thermosetting resin for connecting the TFT substrate 10 and the counter substrate 20 at their peripherals. Spacers, such as glass fiber or glass beads for separating both substrates from each other by a predetermined distance are mixed with the adhesive agent.

On the other hand, on the TFT array substrate 10, besides the aforementioned pixel electrodes 9a and the alignment film 16, various constituents including them are provided in a laminated structure. As shown in FIG. 4, the laminated structure includes, in the following order from TFT array substrate 10, a first layer having lower light-shielding film 11a, a second layer having the TFT 30 and the scanning line 3a, a third layer having the storage capacitor 70 and data line 6a, a fourth layer having shielding layer 400, and a fifth layer (the uppermost layer) having the aforementioned pixel electrode 9a and the alignment film 16. In addition, a base insulating film 12 is provided between the first layer and the second layer, a first interlayer insulating film 41 is provided between the second layer and the third layer, a second interlayer insulating film 42 is provided between the third layer and the fourth layer, and a third interlayer insulating film 43 is provided between the fourth layer and the fifth layer in order to prevent short circuit among the aforementioned elements. In addition, contact holes to electrically connect heavily doped source regions 1d within the semiconductor layer 1a of the TFTs 30 with the data lines 6a are also provided in the various insulating films 12, 41, 42, and 43. Now, these elements will be described in the aforementioned order from the bottom.

First, the lower light-shielding films 11a which are made of for example, a metal simple substance, a metal alloy, a metal silicide, a poly silicide, or a structure staking thereon including at least one of high melting point metals, such as Ti (titan), Cr (chromium), W (tungsten), Ta (tantalum), and Mo (molybdenum), etc. is provided on the first layer. The lower light-shielding film 11a is patterned in lattice in plan view, and according to such a shape, opening regions for pixels are defined (see FIG. 2). Regions protruded so as to round corners of the pixel electrodes 9a are formed at the regions of the lower light-shielding films 11a where scanning lines 3a and the data lines 6a intersect. In addition, in order to prevent the potential variation from having bad effect on the TFTs 30, it is preferable that the lower light-shielding film 11a extend from the image display regions to peripherals thereof to be connected to a constant potential source.

Next, the TFTs 30 and the scanning lines 3a are provided on the second layer. The TFTs 30 have a LDD (lightly doped drain) structures as shown in FIG. 4 and include the scanning lines 3a which function as a gate electrode as described above, the channel regions 1a' of the semiconductor layer 1a where channels are formed by electric fields from the scanning lines 3a made of a polysilicon film, insulating films 2 having gate insulating films which insulate the scanning lines 3a from the semiconductor layer 1a, lightly doped source regions 1b, lightly doped drain regions 1c, heavily doped source regions 1d, and heavily doped drain regions 1e in the semiconductor layer 1a.

Furthermore, although it is preferable that the TFTs 30 have the LDD structure as shown in FIG. 4, the TFTs may have an offset structure where impurity implantation is not performed to the lightly doped source regions 1b and the lightly doped drain regions 1c. Otherwise the TFTs may be a self-aligned type TFT in which impurities are implanted heavily by using the gate electrodes which are formed to be some portions of the scanning lines 3a as masks. Then the heavily doped source regions and the heavily doped drain regions are formed in a self-aligned manner. In addition, in the present exemplary embodiment, although the single gate structure in which the only one gate electrode of the pixel switching TFT 30 is provided between the heavily doped source regions 1d and the heavily doped drain regions 1e is used, two or more gate electrodes may be provided between them. Likewise, if the TFT is constructed in dual gates, triple gates, or more, the leakage current at the connection portions of the channel and source regions and the drain regions can be prevented so that it is possible to reduce current in the OFF state. In addition, the semiconductor layer 1a which constructs the TFTs 30 may be a non-single crystalline layer or a single crystalline layer. Known methods, such as an attaching method may be used for the formation of the single crystalline layer. In particular, by forming the semiconductor layer 1a with the single crystalline layer, it is possible to obtain high performance of peripheral circuits.

The base insulating film 12 which is made of; for example, a silicon oxide film, is provided above the aforementioned lower light-shielding films 11a and below the TFTs 30. Other than the function of insulating the interlayers from the lower light-shielding films 11a to the TFTs 30, the base insulating film 12 has a function of preventing the properties of the pixel switching TFTs 30 from varying due to the roughness which is generated at the time of polishing the surface of the TFT array substrate 10 or contaminants which remain after the cleaning by being formed on the entire surface of the TFT array substrate 10.

Furthermore, in the present exemplary embodiment, particularly, in the base insulating film 12, grooves 12cv (grooves formed in a contact hole shape), having the same width as the channel length or having a width longer than the channel length, are engraved in both sides of the semiconductor layer 1a in plan view. The scanning lines 3a, which are laminated corresponding to the grooves 12cv, have concave portions formed at lower sides thereof (these are not shown to avoid complexity in FIG. 2). In addition, by forming the scanning lines 3a so as to bury the entire grooves 12cv, horizontal protrusions 3b, which are formed in one body with the scanning line 3a, are provided to extend to the scanning line 3a. According to such a structure, the semiconductor layer 1a of the TFT 30 is covered from the sides in plan view as well-shown in FIG. 2 so that it is possible to suppress the incident of the light from at least this part. In addition, the horizontal protrusions 3b may be formed at only one side of the semiconductor layer 1a.

Following the aforementioned second layer, on the third layer, a storage capacitor 70 and the data line 6a are provided. The storage capacitor 70 is formed by facing a first relay layer 71 as a pixel-potential-side capacitor electrode, which is electrically connected with the heavily doped drain region 1e of the TFT 30 and the pixel electrode 9a, to capacitor electrode 300 as a fixed-potential-side capacitor electrode through the dielectric film 75. It is possible to greatly enhance the potential holding property of the pixel electrodes 9a by the storage capacitor 70. In addition, the storage capacitors 70 according to the exemplary embodiment are formed not to reach a light transmitting region corresponding almost to a region for forming the pixel electrode 9a, as shown in the plan view of FIG. 2. For example, the storage capacitor 70 is formed so as to be accommodated into the light-shielding regions. Namely, the storage capacitor 70 is formed on a region which overlaps the scanning lines 3a between the adjacent data lines 6a and a region in which the lower light-shielding film 11a rounds the corners of the pixel electrode 9a at corner portions where the scanning line 3a intersects the data line 6a. By doing so, the pixel aperture ratio of the entire electro-optical device is maintained to be relatively large, so that it is possible to display brighter images.

More specifically, the first relay layer 71 is made of, for example, a conductive polysilicon film and functions as a pixel-potential-side capacitor electrode. However, the first relay layer 71 may be constructed in a single layer film or a multi-layered film including metals or alloys thereof. In case of the multi-layered film, it is preferable that the lower layers be constructed with the conductive polysilicon film having light-absorbing property and the upper layers be constructed with metals having a light-reflecting property or alloys thereof. In addition to the function as the pixel-potential-side capacitor electrode, the first relay layer 71 has a function for relay-connecting the pixel electrode 9a with the heavily doped drain region 1e of the TFT 30 through contact holes 83, 85, and 89. The first relay layer 71 is formed to have almost the same shape as the plane shape of the capacitor electrode 300 described later as shown in FIG. 2.

The capacitor electrode 300 functions as a fixed-potential-side capacitor electrode of the storage capacitor 70. In the first exemplary embodiment, in order to keep the capacitor electrode 300 to be a fixed potential, the capacitor electrode is electrically connected through the contact hole 87 to the shielding layer 400 which is a fixed potential.

Moreover, in particular, in this exemplary embodiment, the data lines 6a are made of the same films as the capacitor electrodes 300. Herein, "the same films" refers to the same layers or layers that are formed at the same time in manufacturing process steps. However, the capacitor electrodes 300 and the data lines 6a are not continuously formed in a plan view but divided therebetween based on the patterning.

Specifically, as shown in FIG. 2, the capacitor electrodes 300 are formed to overlap the regions forming the scanning lines 3a, that is, to be divided along the X direction in the figure, and the data lines 6a are formed to overlap the semiconductor layer 1a in the longitudinal direction thereof, that is, to extend in the Y direction in the figure. More specifically, the capacitor electrodes 300 include main line portions which extend along the scanning lines 3a, and protrusions (portions shown as approximately a trapezoid shape in the figure) protruded upwardly in the figure along the semiconductor layer 1a in the regions which are adjacent to the semiconductor layer 1a in FIG. 2, and necking portions having 'necking shapes' corresponding to the below-described contact holes 85. The protrusions contribute greatly to the increase of the regions forming storage capacitors 70.

On the other hand, the data lines 6a include main line portions which extend linearly along the Y direction in FIG. 2. In addition, the heavily doped drain regions 1e, which are at the upper end in FIG. 2 of the semiconductor layer 1a, have a shape wherein the regions curve toward the right side perpendicularly, that is, at 90 degrees, in order to overlap the regions of the protrusions of the storage capacitors 70, thereby electrically connecting the semiconductor layer 1a with the storage capacitors 70 avoiding the data lines 6a (see FIG. 4).

In the exemplary embodiment, such a patterning is performed to obtain the aforementioned shapes, and thus, the capacitor electrodes 300 and the data lines 6a are simultaneously formed.

In addition, the capacitor electrode 300 and the data line 6a are formed of films having a two-layered structure, as shown in FIG. 4, in which the lower layer is made of conductive polysilicon and the upper layer is made of aluminum. Although the data line 6a are electrically connected to the semiconductor layer 1a of the TFT 30 through the contact hole 81, which passes through opening portion of the below-described dielectric film 75, the data line 6a has the aforementioned two-layered structure and the aforementioned first relay layer 71 is constructed with a conductive polysilicon film, so that the electrical connection between the data lines 6a and the semiconductor layer 1a can be directly implemented by the conductive polysilicon film. Namely, a polysilicon film of first relay layer, a polysilicon film below the data line 6a, and an aluminum film above the data line are formed in this order from the bottom. Therefore, it is possible to maintain a good electrical connection between them. According to the present exemplary embodiment, each of the data lines 6a and the capacitive lines 300 has a two-layer structure of the conductive poly silicon layer and the aluminum layer. However, each may have a three-layer structure of the conductive poly silicon layer, the aluminum layer, and a titan nitride layer in the order from the lowermost layer.

According to this structure, the titan nitride layer functions as a barrier metal to prevent the portion not to be etched from being etched when the contact hole 87 is formed.

Since the capacitor electrode 300 and the data line 6a include aluminum, having relatively excellent light reflective property and also polysilicon, having relatively excellent light absorbing property, the capacitor electrode 300 and the data line 6a can function as light-shielding layers. In other words, the capacitor electrode 300 and the data line 6a are able to block the progress of the incident light (see FIG. 4) for the semiconductor layer 1a at the upper side thereof.

The dielectric film 75 is constructed with a silicon oxide film such as a HTO (high temperature oxide) film, and a LTO (low temperature oxide) film, etc., or a silicon nitride film having relatively thin thickness, for example, about 5 to 200 nm, as shown FIG. 4. In view of increasing the storage capacitor 70, the thinner dielectric films 75 are preferable, as long as sufficient reliabilities of the films are obtained. According to the present exemplary embodiment, in particular, the dielectric film 75 has a two-layer structure, in which a lower layer is formed of a silicon oxide film 75a and an upper layer is formed of a silicon nitride film 75b, as illustrated in FIG. 4. The upper silicon nitride film 75 is patterned so as to be included in a light-shielding region (a non-aperture region). Therefore, it is possible to increase the capacitance of the storage capacitor 70 due to the presence of the silicon nitride film 75b with a relatively large dielectric constant. Also, still, the capacity of the storage capacitor 70 to withstand voltage does not deteriorate due to the presence of the silicon oxide film 75a. As mentioned above, it is possible to obtain two reciprocal effects by the dielectric film 75 having the two-layer structure. Also, it is possible to prevent the transmittance rate from deteriorating because the colored silicon nitride 75b is patterned so as not to be formed in a region that light transmits. Also, it is possible to prevent the TFT 30 from being submerged due to the presence of the silicon nitride film 75b. Therefore, according to the present exemplary embodiment, it is possible to prevent the threshold voltage of the TFT 30 from increasing and to operate the device for a relatively long time. According to the present exemplary embodiment, the dielectric film 75 has the two-layer structure. However, the dielectric film 75 may have a three or more laminated layer structure such as the silicon oxide film, the silicon nitride film, and the silicon oxide film.

A first interlayer insulating film 41 is formed above the TFT 30 or the scanning line 3a and below the storage capacitor 70 or the data line 6a. The first interlayer insulating film 41 is made of, for example, a silicate glass film such as NSG (non-doped silicate glass), PSG (phosphorus silicate glass), BSG (boron silicate glass), and BPSG (boron phosphorus silicate glass), a silicon nitride film, a silicon oxide film, or preferably NSG. In addition, the contact hole 81 which electrically connects the heavily doped source region 1d of the TFT 30 with the data line 6a is opened in the first interlayer insulating film 41. Furthermore, the contact hole 83 which electrically connects the heavily doped drain region 1e of the TFT 30 with the first relay layer 71 constituting the storage capacitor 70 is opened in the first interlayer insulating film 41.

In addition, in order not to form the aforementioned dielectric film 75 on the portion for forming the contact hole 81 from the two contact holes, opening portions are formed in the dielectric film 75. The reason for such a formation is that it is necessary to facilitate the electric conduction between the heavily doped source regions 1b and the data lines 6a through the first relay layers 71 on the contact hole 81. Namely, if the opening portion is provided in the dielectric film 75, in case of performing a hydrogenation process on the semiconductor layer 1a of the TFT 30, it is possible to obtain the function and effect wherein hydrogen used in the process can easily reach the semiconductor layer 1a through the opening portion.

Furthermore, in the exemplary embodiment, the first interlayer insulating film 41 may undergo a sintering process at 1000° C., and thus, the ions which are implanted into the polysilicon film constituting the semiconductor layer 1a or the scanning line 3a may be activated.

Following the aforementioned third layer, shielding layers 400 are provided on the fourth layer. The shielding layers 400 are formed in lattice to extend in the X and Y directions of FIG. 2 in plan view as shown in FIGS. 2 and 3. The portions of the shielding layers 400 which extend in the Y direction of FIG. 2 are formed to be wider than the data lines 6a, thereby covering the data lines 6a. In addition, the portions which extend in the X direction of FIG. 2 have notched portions in the vicinity of approximately the center position of one side of each pixel electrode 9a in order to ensure regions for forming the below-described second relay layer 402. In addition, at the corner portions of the intersections of the shielding layers 400 which extend in the X and Y directions of FIG. 2, respectively, portions which have approximately a triangle shape are provided to correspond to the protrusions of the capacitor electrodes 300 which have approximately a trapezoid shape. The almost triangular portion is also included in the shielding layer 400. The shielding layer 400 may be as wide as, wider than, or narrower than the lower light-shielding film 11a.

The shielding layers 400 are provided to extend from the image display regions 10a on which the pixel electrodes 9a are provided to their peripherals, and electrically connected to the constant potential source to be at a fixed potential. In addition, "the constant potential source" referred herein may be the constant potential source, such as a positive power source or a negative power source supplied to a data line driving circuit 101, or a constant potential source supplied to the counter electrode 21 of the counter substrate 20.

Like this, since the entire data lines 6a are covered (see FIG. 3) and the shielding layers 400 are at the fixed potential, it is possible to remove the influence of the capacitance coupling which occurs between the data lines 6a and the pixel electrodes 9a. Namely, by the electrical conduction to the data lines 6a, it is possible to prevent the variation of the potential of the pixel electrodes 9a in advance, and thus, it is possible to reduce the probability of occurrence of the display non-uniformity involved in the data lines 6a on the image. In the exemplary embodiment, since the shielding layers 400 are formed in lattice, it is possible to suppress the unnecessary capacitance couplings at the portions to which the scanning lines 3a extend. In addition, by the aforementioned portions of the triangle shape of the shielding layers 400, it is possible to reduce or prevent the influence of the capacitance coupling which occurs between the capacitor electrodes 300 and the pixel electrodes 9a, and by doing so, it is possible to obtain the substantially same functions and effects described above.

In addition, on the fourth layer, second relay layer 402 which is one example of "relay layers" referred in the present invention are formed of the same film as the shielding layers 400. The second relay layer 402 has a function of relaying an electrical connection between the pixel electrodes 9a and the first relay layers 71, which constitute the storage capacitors 70, through the below-described contact holes 89. In addition, the shielding layers 400 and the second relay layer 402 are not continuously formed in a plan view, but divided based on the patterning which is similar to the aforementioned capacitor electrodes 300 and the data lines 6a.

However, the shielding layers 400 and the second relay layer 402 have a two-layered structure in which the lower layer is made of aluminum and the upper layer is made of titanium nitride. Therefore, the titan nitride is expected to function as the barrier metal to prevent the portion not to be etched from being etched when the contact hole 89 is formed. Also, in the second relay layer 402, the lower layer made of aluminum is connected to the first relay layer 71 that constitutes the storage capacitor 70. The upper layer made of the titan nitride is connected to the pixel electrode 9a made of ITO. In this case, in particular, the latter connection is excellent. If the aluminum is directly connected to the ITO, a desired electrical connection is not realized because electrical erosion occurs between the aluminum and the ITO, thereby causing the disconnection of the aluminum or insulation due to the formation of alumina. As mentioned above, according to the present exemplary embodiment, it is possible to realize excellent electric connection between the second relay layer 402 and the pixel electrode 9a and thereby to maintain excellent properties of applying voltage to the pixel electrode 9a or maintaining electric potential in the pixel electrode 9a.

In addition, since the shielding layers 400 and the second relay layer 402 include aluminum having relatively good light reflective property and also titanium nitride having relatively good light absorbing property, the shielding layers 400 and the second relay layer 402 can function as light-shielding layers. For example, the shielding layers 400 and the second relay layer 402 are able to block the travel of the incident light (see FIG. 2) to the semiconductor layer 11a at the upper side thereof. These are similar to the capacitor electrodes 300 and the data lines 6a as described above. In the exemplary embodiment, the shielding layers 400, the second relay layer 402, the capacitor electrodes 300, and the data lines 6a constitute some portions of the laminated structure which is formed on the TFT array substrate 110 and also in consideration of constituting the upper light-shielding film or "some portions of the laminated structure" which block the light incident from the upper side to the TFTs 30, thereby functioning as "an embedded light-shielding film." In addition, according to the concept of the "upper light-shielding film" or the "embedded light-shielding film," the scanning lines 3a or the first relay layers 71 can be also included. Essentially, the "upper light-shielding film" or the "embedded light-shielding film" is to be understood in its broad meaning, and all the structures made of opaque materials constructed on the TFT array substrate 10 can be referred to as the "upper light-shielding film" or the "embedded light-shielding film".

A second interlayer insulating film 42 is formed above the data line 6a and below the shielding layer 400. The second interlayer insulating film 42 is made of, for example, a silicate glass film, such as NSG, PSG, BSG, and BPSG, a silicon nitride film, a silicon oxide film, or preferably NSG. The contact hole 87, which electrically connects the shielding layer 400 and the capacitor electrode 300, and the contact hole 85 which electrically connects the second relay electrode 402 with the first relay layer 71, are opened in the second interlayer insulating film 42.

Furthermore, since the second interlayer insulating film 42 does not undergo the sintering process, which is described above with respect to the first interlayer insulating film 41, it is preferable to lessen the stress which occurs in the vicinity of the boundary surface of the capacitor electrode 300.

Finally, on the fifth layer, the pixel electrode 9a is formed in a matrix as described above and the alignment film 16 is formed on the pixel electrode 9a. The pixel electrode 9a may have a shape in which their corner portions are cut. In addition, a third interlayer insulating film 43 is formed below the pixel electrode 9a. The third interlayer insulating film 43 is made of, for example, a silicate glass film such as NSG, PSG, BSG, and BPSG, a silicon nitride film, a silicon oxide film, or preferably BPSG. According to the present exemplary embodiment, in particular, the contact hole 89, to electrically connect the pixel electrode 9a to the second relay layer 402, is formed in the third interlayer insulating film 43. Also, the filler 409a is formed in the contact hole 89. The surface of the third interlayer insulating film 43 is planarized. The above will be described in relation to the following items.

Structure of Third Interlayer Insulating Film

In the following, the structure of the above-mentioned third interlayer insulating film 43, to be specific, the structure of the contact hole formed in the third interlayer insulating film 43 will be described with reference to FIGS. 4 to 9. Here, FIGS. 5 to 9 have the same purpose as FIG. 4. However, differences between FIGS. 5 to 9 and FIG. 4 will be mentioned hereinafter. Further, in the following, the various characteristics of the third interlayer insulating film 43 will now be described according to first to third exemplary embodiments. According to the first to third exemplary embodiments, only differences among the respective exemplary embodiments, such as the structure of the filler will be mainly described. Description of the remaining structures will be appropriately simplified or omitted (The remaining structures are basically the same as the above-mentioned).

First Exemplary Embodiment

Case Where the Filler is Formed of the Same Film as the Pixel Electrode

According to the first exemplary embodiment, the filler 409a is included in the entire region inside the contact holes 89 as illustrated in FIG. 4. To be specific, the filler 409a is formed of the same film as the pixel electrode 9a, and then the filler is made of a transparent conductive material such as the ITO. As a result, it is possible to perform processes of forming or film forming the pixel electrode 9a and forming the filler 409a inside the contact hole 89 at the same time and thereby to reduce the manufacturing cost of the corresponding pixel electrode and the filler. According to the first exemplary embodiment, the surface of the third interlayer insulating film 43 is planarized by CMP (chemical mechanical polishing) process.

Since the third interlayer insulating film 43 and the contact hole 89 have such structures, according to the first exemplary embodiment, a concavo-convex portion, in particular, a concave portion caused by the contact hole 89, is not formed in the surface of the alignment film 16. This is because it is possible to prevent the concave portion from being formed in the alignment film 16 due to the presence of the hollow in the related art since the filler 409a is included in the entire region inside the contact holes 89. Further, according to the first exemplary embodiment, because the third interlayer insulating film 43 is planarized, the concavo-convex portion caused by various wiring lines or elements under the third interlayer insulating film becomes uniform. Therefore, the flatness of the alignment film 16 is obtained. In particular, according to the electro-optical device of the present exemplary embodiment, as mentioned above, the storage capacitor 70 or the shielding layer 400 is formed in the laminated structure on the TFT array substrate 10. As a result, the step differences caused by different heights of the respective components can be more easily formed because the laminated structure becomes more complicated. Therefore, a larger effect is obtained by planarizing the third interlayer insulating film.

As mentioned above, according to the first exemplary embodiment, the alignment state of the liquid crystal molecules that form the liquid crystal layer 50 is not unnecessarily disturbed. Therefore, light leakage caused by the disturbance does not occur. As a result, it is possible to display an image with excellent quality.

Furthermore, as a principle, it is possible to prevent light from being transmitted through the hollow of the contact hole 89, like in the related art, due to the presence of the filler 409a according to the first exemplary embodiment. This is because the hollow does not exist due to the presence of the filler 409a. Therefore, the light leakage is not caused easily. Also, according to the first exemplary embodiment, the filler 409a is made of the transparent conductive material such as the ITO. However, according to the first exemplary embodiment, it is possible to obtain the corresponding light-shielding effect because the transparency of the transparent conductive material generally deteriorates with the growth of the thickness.

As mentioned above, according to the first exemplary embodiment, it is possible to reduce or prevent the quality of an image from deteriorating due to the deterioration of contrast caused by the light leakage and to display an image with excellent quality.

Furthermore, according to the first exemplary embodiment, because the contact hole 89 is filled with the filler 409a, as illustrated in FIG. 4, it is possible to secure a larger contact area between the filler 409a and the second relay layer 402. Therefore, it is possible to deteriorate the value of resistance between the filler 409a and the second relay layer 402. As a result, according to the first exemplary embodiment, it is possible to realize an excellent and firm electric connection between the pixel electrode 9a and the TFT 30.

Figure 5:
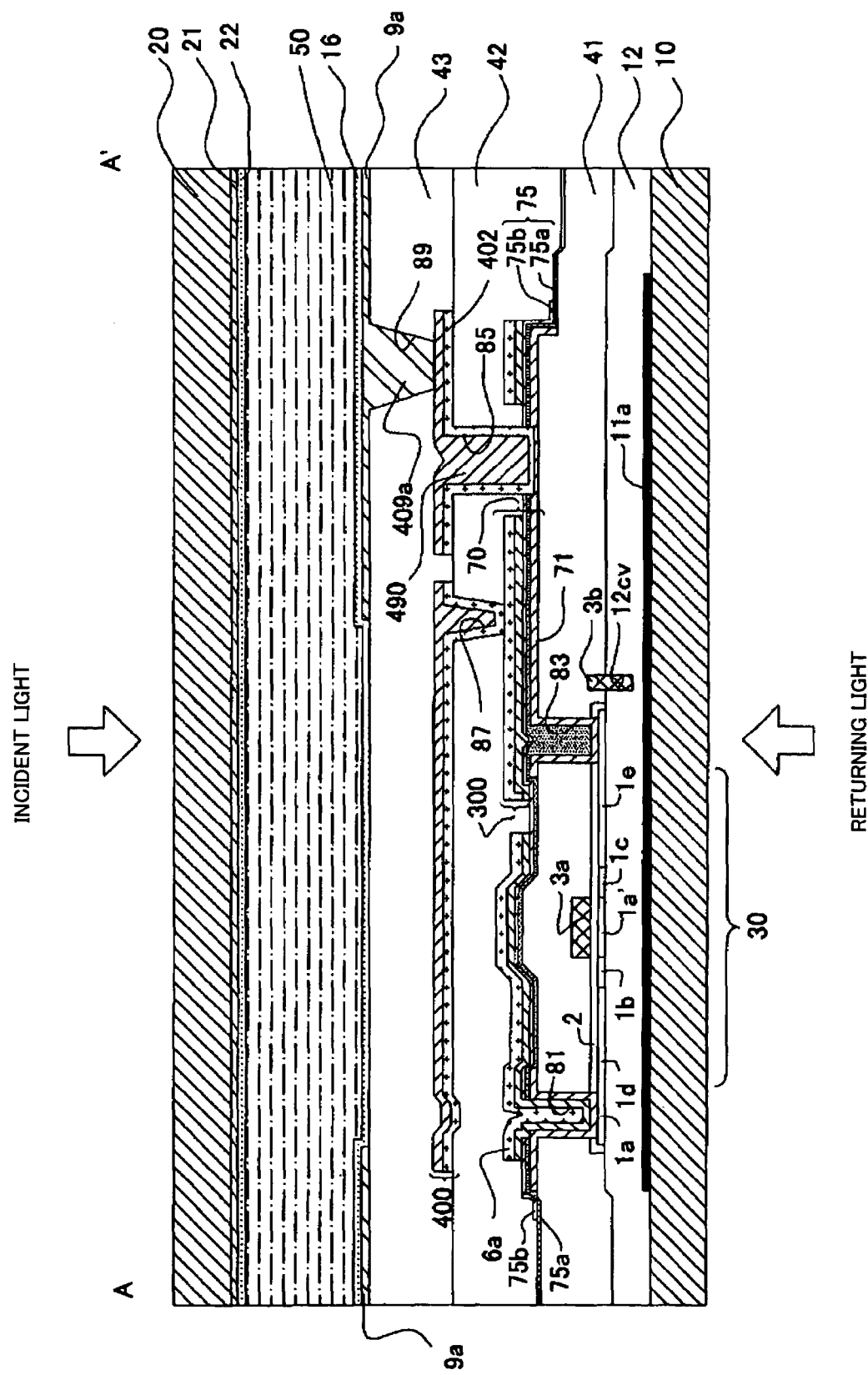
FIG. 5 is a cross-sectional view taken along the plane A-A', which illustrates a modification of FIG. 3.

Further, in the above exemplary embodiment, only the contact hole 89 is filled with the filler 409a. However, the present invention is not limited thereto. For example, as illustrated in FIG. 5, a filler 490 may be filled in the entire region inside a contact hole 85 (corresponding to an example of another contact holes according to the present invention) that may affect the shape of the surface of the alignment film 16. In this case, because the shielding layer 400 has a two-layer structure, in which a lower layer is formed of an aluminum film and an upper layer is formed of a titan nitride film, the filler 490 is preferably formed of the titan nitride film as illustrated in FIG. 5. The filler 490 may be made of another materials (Please refer to the following second and third exemplary embodiments.). Furthermore, a contact hole 87 to electrically connect the shielding layer 400 to the storage capacitor 70 may have the same structure. In FIG. 4, it seems that the contact hole is already filled. Therefore, it is possible to reduce a probability of forming the concave portion in the alignment film 16.

Further, an example of planarizing the third interlayer insulating film 43 by the CMP process is mentioned above. However, the present invention is not limited thereto. For example, instead of or further to the CUT process, an etchback method may be used. Furthermore, the surface of the third interlayer insulating film 43 may be "passively" planarized by grooving at least one among the TFT array substrate 10, the base insulating film 12, the first interlayer insulating film 41, and the second interlayer insulating film 42 and by burying the wiring lines such as the data lines 6a or the TFT 30 in the grooves instead of or further to "actively" planarizing the surface of the third interlayer insulating film 43.

Furthermore, the "contact hole" according to the present invention is limited to "electrically connecting" the TFT 30 to the pixel electrode 9a. However, the "connection" mentioned here includes cases according to the present exemplary embodiments. That is, the contact hole 89 is not directly "connected" to the TFT 30, but is electrically connected to the TFT 30 through the second relay layer 402 and the contact hole 85 and the first relay layer 71 and the contact hole 83. However, such a "connection" is also included in the "connection" according to the present invention.

Second Exemplary Embodiment

Case Where the Filler is Made of a Light-Shielding Material

Figure 6:
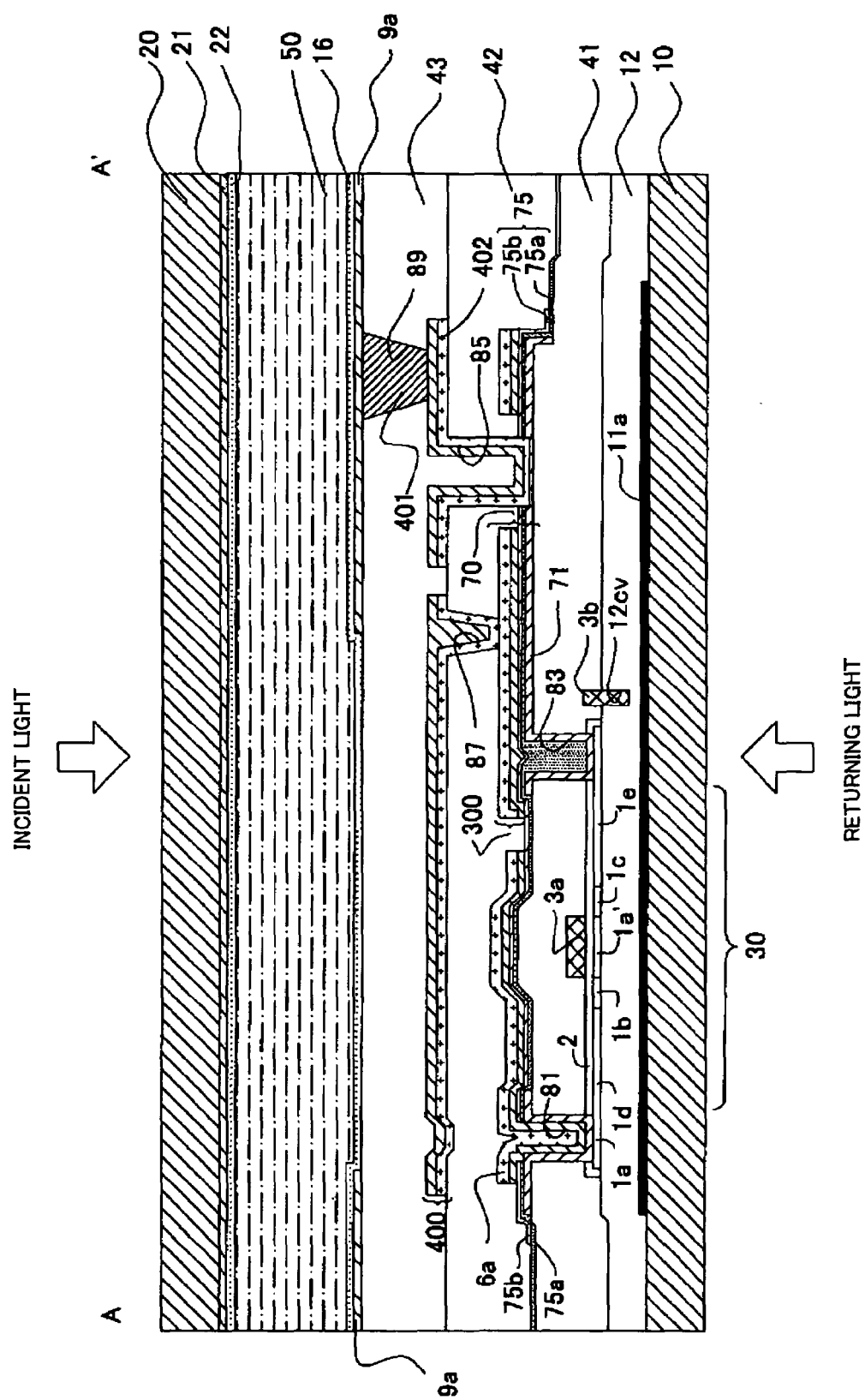
FIG. 6 is related to the second exemplary embodiment of the present invention and has the same purpose as FIG. 3, however, is a cross-sectional view taken along the plane A-A', which illustrates that the filler inside the contact hole is made of a different material from that of FIG. 3.

A second exemplary embodiment will now be described hereinafter. According to the second exemplary embodiment, as illustrated in FIG. 6, a filler 401 is not formed of the same film as the pixel electrode 9a, but is formed as a different layer. To be specific, the filler 401, according to the second exemplary embodiment, is a light-shielding conductive material such as a metal monomer including at least one among Ti (Titanium), Cr (chrome), W (tungsten), Ta (tantalum), and Mo (molybdenum), an alloy, metal silicide, and poly silicide.

The second exemplary embodiment has almost the same effect as the first exemplary embodiment. That is, the concave portion is not formed in the alignment film 16 because the hollow does not exist inside the contact hole 89. Also, it is possible to realize an excellent electric contact between the second relay layer 402 and the contact hole 89.

According to the second exemplary embodiment, in particular, it is possible to reduce or prevent the light leakage in the contact hole 89 because the filler 401 is made of the light-shielding material. That is, according to the first exemplary embodiment, the expected operation of preventing the light leakage is limited because the filler 409a is made of the transparent conductive material. However, according to the second exemplary embodiment, it is possible to reduce or prevent the light leakage because the above-mentioned light-shielding material such as Ti shields light better.

Therefore, according to the second exemplary embodiment, it is possible to reduce or prevent the quality of an image from deteriorating due to the above-mentioned operation. Also, according to the excellent light-shielding effect, it is possible to effectively reduce or prevent light from being incident on the semiconductor layer 1a of the TFT 30. Therefore, it is possible to more effectively reduce or prevent flicker from being generated in the image due to the generation of light leakage current in the semiconductor layer 1a. Also, such an effect is appropriately obtained according to the above-mentioned first exemplary embodiment.

Third Exemplary Embodiment

Case Where Two-Layer Structure is Formed Inside the Contact Hole

Figure 7:
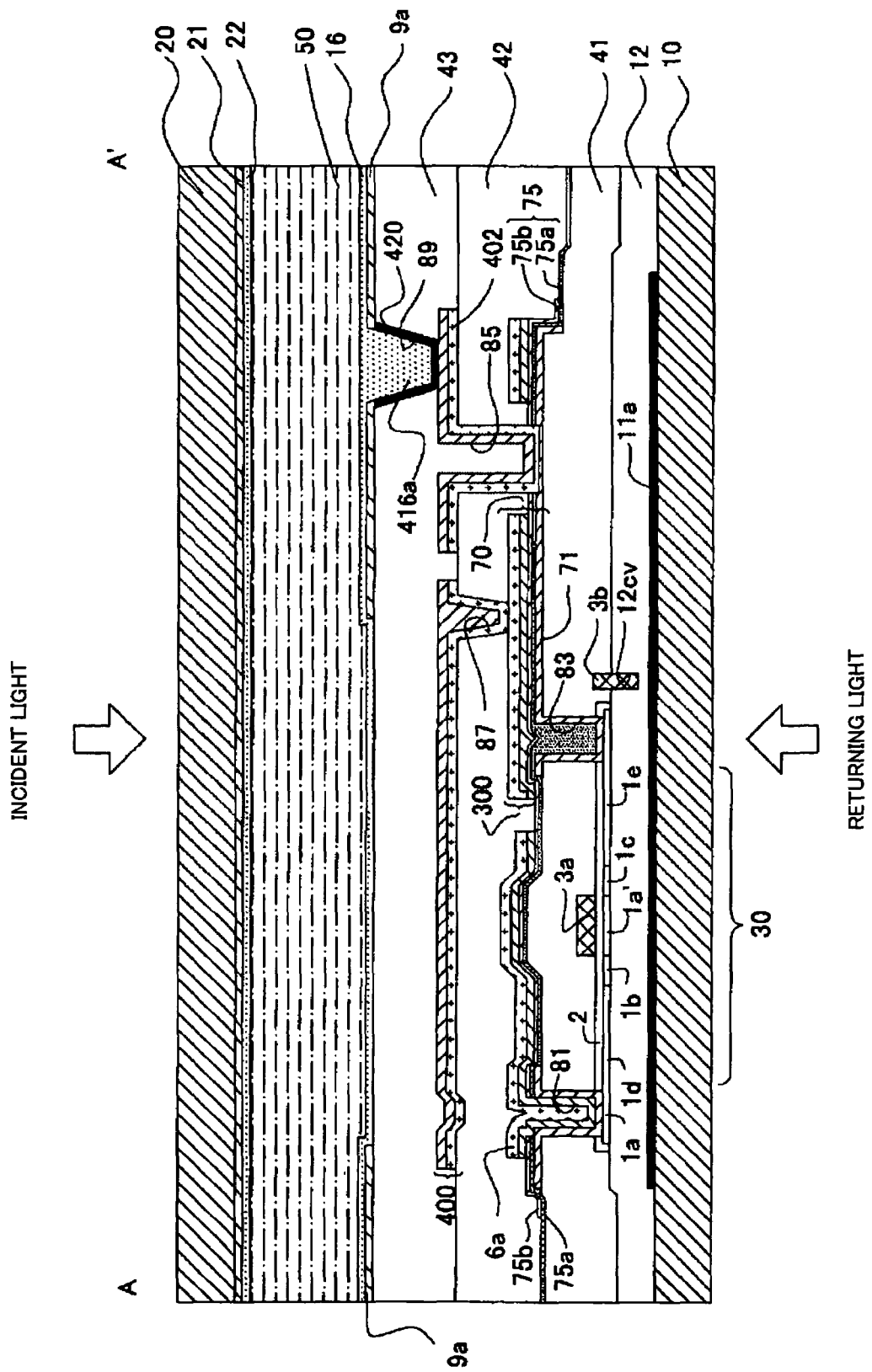
FIG. 7 is related to the third exemplary embodiment of the present invention and has the same purpose as FIG. 3, however, is a cross-sectional view taken along the plane A-A', which illustrates that FIG. 7 is different from FIG. 3 in that a coating member is disposed inside the contact hole.

A third exemplary embodiment will now be described. According to the third exemplary embodiment, as illustrated in FIG. 7, a filler 416a made of a transparent polyimide material that forms the alignment film 16 is included in the entire region inside the contact holes 89. Also, the inner surface of the contact hole 89 is coated with a coating member 420 made of various light-shielding materials that form the filler 401 according to the second exemplary embodiment. Therefore, the coating member 420 is made of the light-shielding and conductive material.

The third exemplary embodiment has the same effect as the first or second exemplary embodiment.

According to the third exemplary embodiment, in addition to the effects of the above exemplary embodiments, the following effects are obtained. That is, it is possible to obtain light-shielding and conductive functions by the coating member 420. Also, it is possible to form the filler 416a at the same time when the alignment film 16 is formed and thereby to reduce the manufacturing cost of the filler.

Further, according to the present invention, in general, the coating member 420 and the filler 416a may be made of any material. However, the coating member 420 is necessarily made of the conductive material because it is not possible to omit the original function of the contact hole to electrically connect the pixel electrode 9a to the second relay layer 402.

Figure 8:
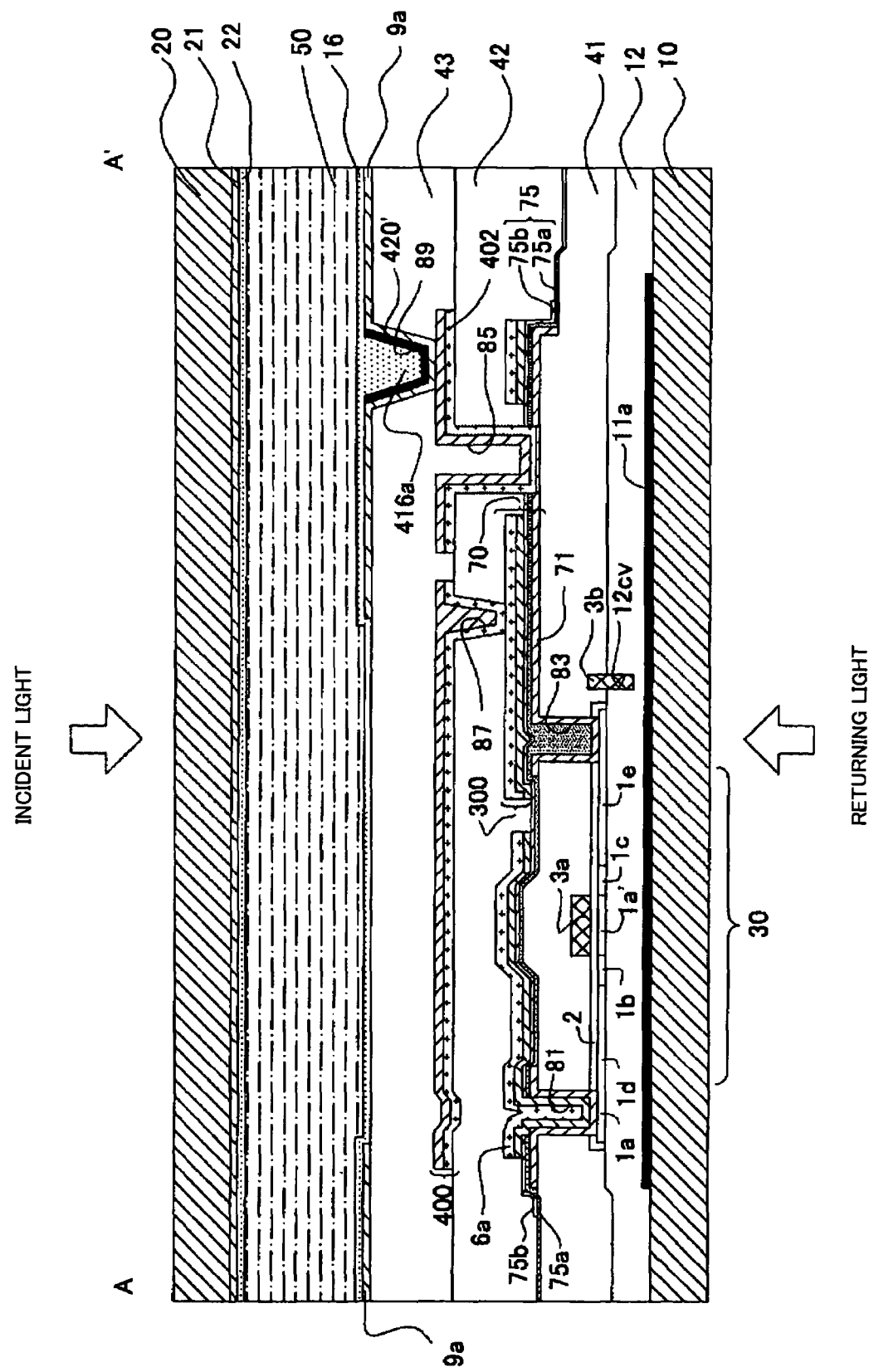
FIG. 8 is a cross-sectional view taken along the plane A-A', which illustrates a modification where a two-layer coating member is disposed in FIG. 7.

Also, the coating member is not necessarily a single layer. For example, as illustrated in FIG. 8, the ITO as the coating member of a first layer, which is extending from the pixel electrode 9a, corresponds to the coating member of a second layer as illustrated in FIG. 7 (Both of the coating members are denoted by reference numeral 420' in the figure). The contact hole 89, in the inner entire region of which the filler 416a is formed, is within the range of the present invention.

Figure 9:
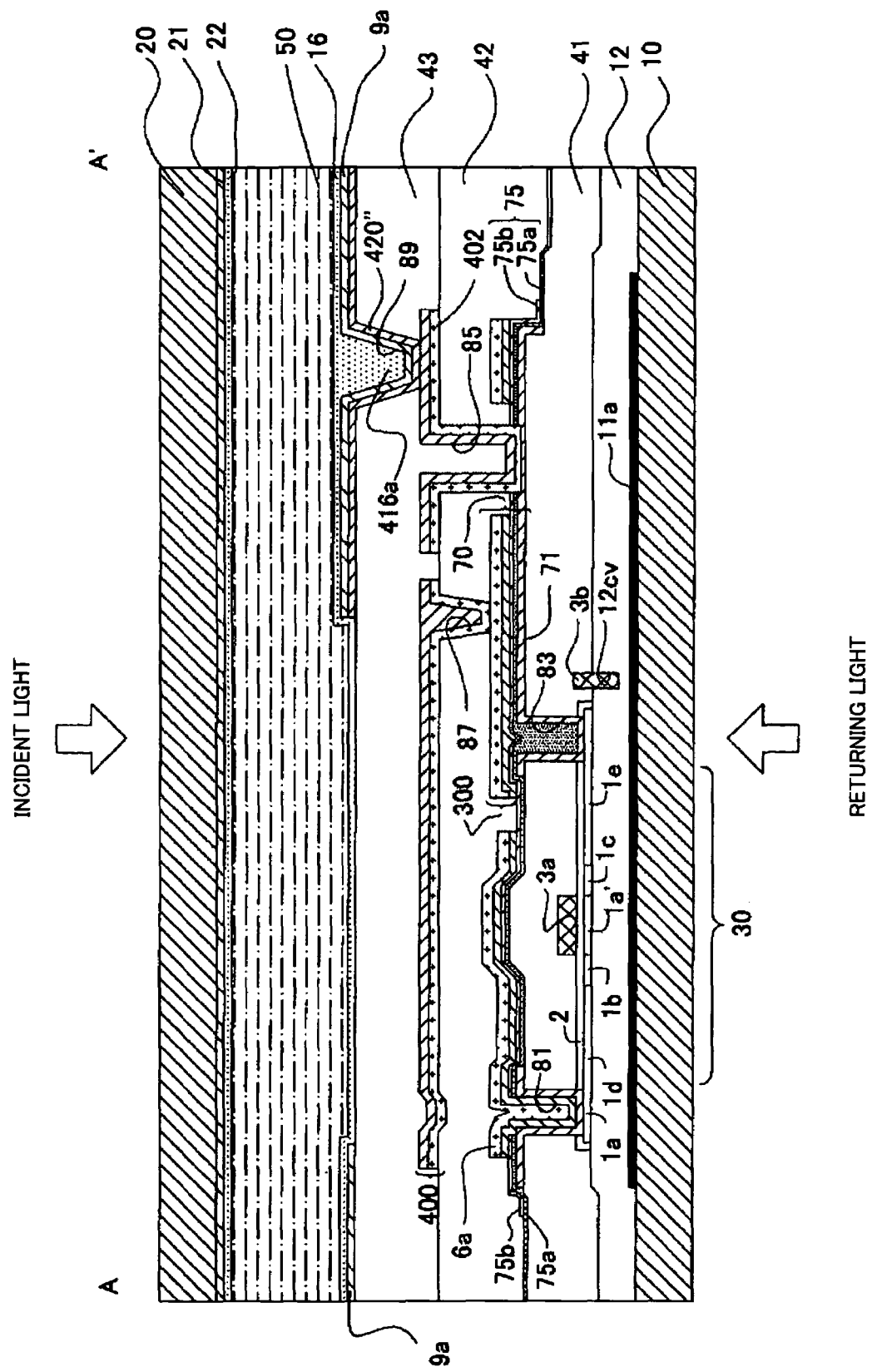
FIG. 9 is a cross-sectional view taken along the plane A-A', which illustrates a modification, in which the coating member is formed to the region where the pixel electrode is formed, in FIG. 8.

Furthermore, according to a modification of FIG. 8, for example, as illustrated in FIG. 9, the coating member 420" may be formed in the entire region on the third interlayer insulating film 43, where the pixel electrode 9a is formed. In this case, the coating member 420" is preferably made of a transparent material. In a case where the reflective type electro-optical device according to the present exemplary embodiment is used, that is, in FIG. 12, where the incident light and light incident on the liquid crystal layer 50 along a predetermined direction are reflected by the pixel electrode 9a and light emitted in the direction reverse to the above direction forms an image, the coating member 420" and the pixel electrode 9a are not necessarily made of the transparent material.

Modifications of Electro-Optical Device

Figure 10:
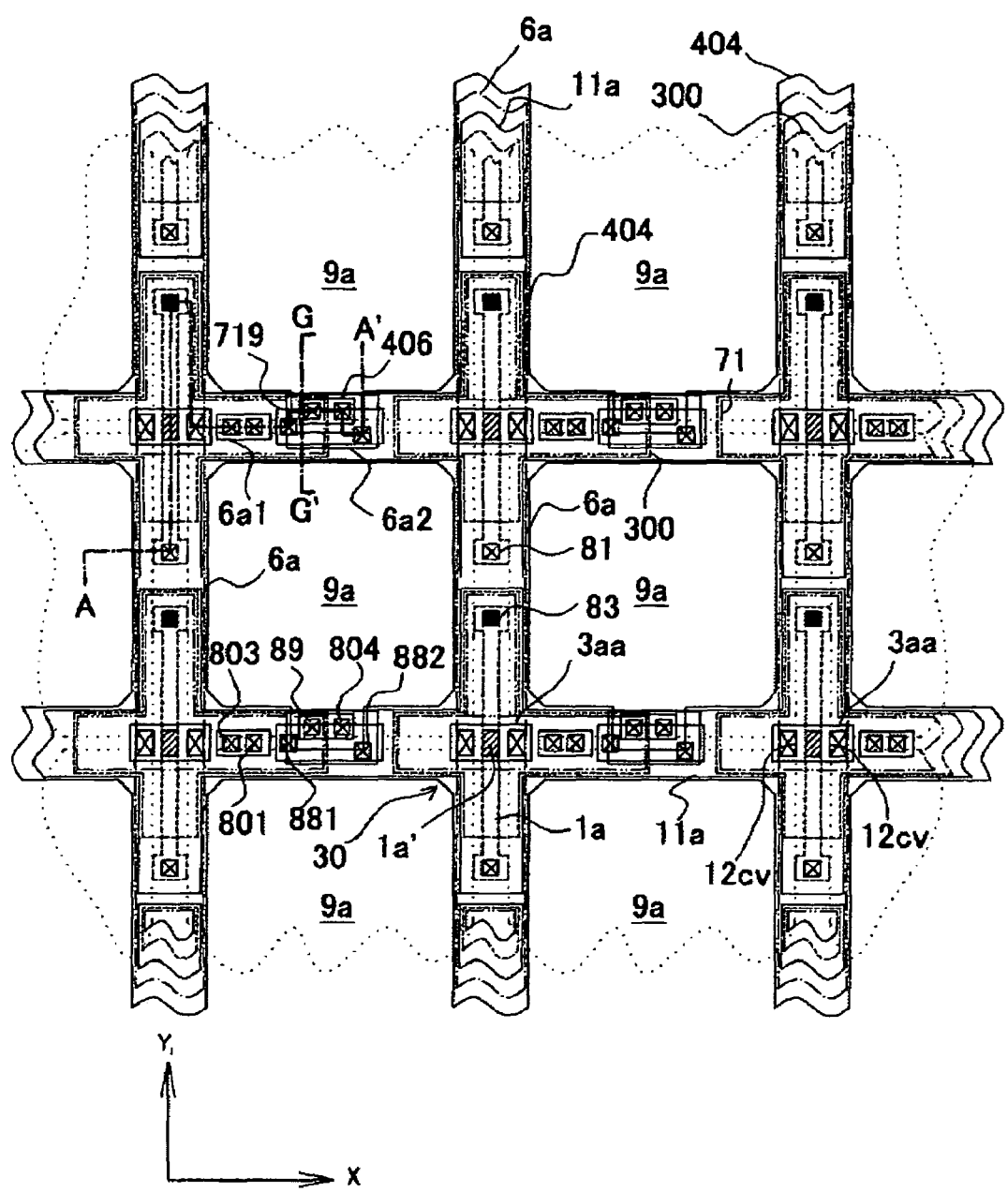
FIG. 10 has the same purpose as FIG. 2 and illustrates an aspect where the storage capacitors are formed in a different layer from the data lines.
Figure 11:
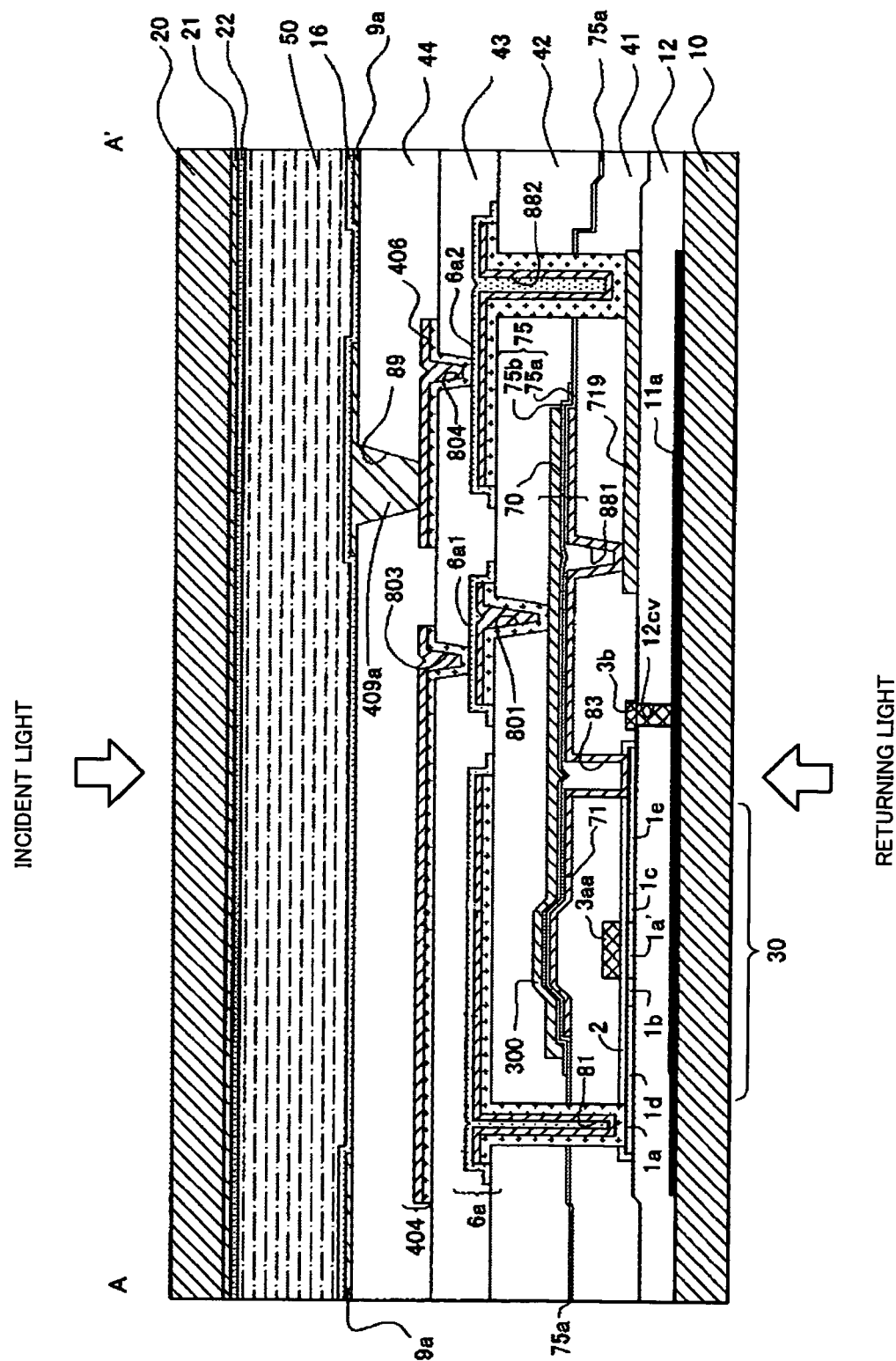
FIG. 11 has the same purpose as FIG. 4 and illustrates an aspect where the storage capacitors are formed in a different layer from the data lines.

A modification of the electro-optical device according to the present invention will now be described with reference to FIGS. 10 and 11. FIGS. 10 and 11 are for the same purposes as FIGS. 2 and 4 and are respectively a plan view and a cross-sectional view that illustrate the characteristics of the modification. Further, the structure of the pixel portion of the electro-optical device according to the modification is almost the same as those of the pixel portions of the electro-optical devices according to the above various exemplary embodiments. Therefore, only the specific portions of the modification will now be described. Description of the remaining portions will be simplified or omitted.

In FIGS. 10 and 11, in comparison to FIGS. 2 and 4, the capacitor electrode 300, which is the upper electrode constituting the storage capacitor 70 and the data line 6a, are not made of the same film, and in addition, interlayer insulating film is added thereto. Namely, the great difference is that one more new 'fourth interlayer insulating film 44' is provided and a relay electrode 719 is formed of the same film as the gate electrode 3aa. By doing so, in the following order starting from the TFT array substrate 10, a first layer which includes the lower light-shielding film 11a functioning also as the scanning line, a second layer which includes the TFT 30 having the gate electrode 3aa, a third layer which includes the storage capacitor 70, a fourth layer which includes the data line 6a, a fifth layer on which a shielding layer 404 is formed, a sixth layer (the uppermost layer) which includes the aforementioned pixel electrode 9a and the alignment film 16, and the like are provided. Furthermore, the base insulating film 12 is formed between the first layer and the second layer, the first interlayer insulating film 41 is formed between the second layer and the third layer, the second interlayer insulating film 42 is formed between the third layer and the fourth layer, the third interlayer insulating film 43 is formed between the fourth layer and the fifth layer, and the fourth interlayer insulating film 44 is formed between the fifth layer and the sixth layer, thereby preventing a short circuit between the aforementioned constituents.

Furthermore, contact hole 801 is formed in the second interlayer insulating film 42 which is located between the aforementioned third and fourth layers, and at the same time, the relay layer 6a1 for the shielding layer is formed to correspond to the contact hole 801 on the fourth layer. Also, the contact hole 803 is formed on the third interlayer insulating film 43 which is located between the aforementioned fourth and fifth layers. By doing so, the electrical connection is obtained between the shielding layer 404 and the capacitor electrodes 300 by the contact hole 801 or the relay layer 6a1 for the shielding layer and the contact hole 803.

In FIG. 11, a high-density drain region 1e of a semiconductor layer 1a is electrically connected to a first relay layer 71. The relay electrode 719 formed of the same film as the gate electrode 3aa is electrically connected to the first relay layer 71. The relay electrode 719 is electrically connected to the pixel electrode 9a.

To be specific, the relay electrode 719 is electrically connected to the pixel electrode 9a through a second relay layer 6a2 and a third relay layer 406. The second relay layer 6a2 is formed of the same film as the data line 6a to bury a contact hole 882 formed to reach the first and second interlayer insulating films 41 and 42 through the relay electrode 719. The third relay layer 406 is formed of the same film as the shielding layer 404 to bury a contact hole 804 formed to reach the third interlayer insulating film 43 through the second relay layer 6a2.

The data line 6a is formed of a three-layer film made of an aluminum layer, a titan nitride layer, and a silicon nitride layer in the order from the bottom.

The silicon nitride film is patterned into a slightly large size so as to cover the aluminum layer and the titan nitride layer thereunder. It is possible to easily supply image signals to the TFT 30 and the pixel electrode 9a because the data line 6a includes aluminum that is a material having relatively low resistance. It is possible to improve the moisture proof property of the TFT 30 and thereby to prolong the life of the TFT because the silicon nitride film is relatively excellent for preventing the permeation of moisture from forming on the data line 6a. The silicon nitride film is preferably a plasma silicon nitride film.

In the above case, the third relay layer 406 is preferably formed of the aluminum film and the titan nitride film as mentioned above because electrical erosion may occur between the third relay layer 406 and the ITO of the pixel electrode 9a. If necessary, the shielding layer 404 and the third relay layer 406 may be formed not to have an island shape but to have a mat shape over the entire surface of the substrate. The shielding layer 404 and the third relay layer 406 may be made of the ITO in order to prevent deterioration of the transmittance ratio of the electro-optical device. They may result in a new shielding layer. In the above case, a hole is formed in the shielding layer in a mat shape so as to form the contact hole 89, such that the contact hole 89 is connected to the second relay layer 6a2. Furthermore, in the above case, the relay layer 6a1 for the shielding layer is not necessary. Furthermore, it is possible to prevent the shielding layer formed in the mat shape from being directly connected to the second relay layer 6a2 and thereby to reduce or prevent the electrical erosion from occurring.

On the other hand, the electrical connection between the relay electrode 719 and the first relay layer 71 is performed through contact hole 881 which is opened in the first interlayer insulating film 41. Namely, after opening the contact hole 881, the precursor film of the first relay layer 71 is formed to bury the contact hole, so that the electrical connection between the first relay layer 71 and the relay electrode 719 can be realized.

By doing so, the electrical connection is formed between the first relay layer 71 and the pixel electrode 9a through the relay electrode 719.

Specifically, although in the aforementioned exemplary embodiment the scanning line 3a is formed to include the gate electrode in the same plane, in this aspect the lower light-shielding film 11a in the aforementioned exemplary embodiment functions as the scanning line in order to obtain the regions in which the relay electrode 719 is formed. The lower light-shielding film 11a according to the present exemplary embodiment is formed in stripes in a plane. Also, the bottom of a groove (that forms the contact hole) 12cv as wide as or wider than the channel length is formed on both sides of the semiconductor layer 1a to contact the lower light-shielding film 11a. A scanning signal is supplied from the lower light-shielding film 11a to a gate electrode 3aa. Therefore, according to the present exemplary embodiment, the horizontal protrusion 3b shields the semiconductor layer 1a from light and also supplies signals to the gate electrode 3aa.

Furthermore, the relay electrode 719 is formed in an island shape to be located at the approximately center potion of one side of each pixel electrode 9a in plan view as shown in FIG. 10. Since the relay electrode 719 and the gate electrode 3aa are formed of the same film, if the latter is made of, for example, a conductive polysilicon film, etc., the former is also made of a conductive polysilicon film, etc.

According to the present aspect, like in the first exemplary embodiment, the entire region inside the contact holes 89 is filled with the filler 409a made of the transparent conductive material such as the ITO. Further, according to the present aspect, the surface of the fourth interlayer insulating film 44 that is an insulating film positioned under the pixel electrode 9a is planarized by the CMP process.

According to a modification having the above-mentioned shape, it is possible to obtain similar effects caused by the presence of the filler 409a inside the contact hole 89. That is, it is possible to reduce or prevent the formation of the concavo-convex portion on the surface of the alignment film 16, in particular, the concave portion caused by the contact hole 89, due to the presence of the filler 409a and to secure the excellent flatness of the alignment film 16. Also, it is possible to reduce or prevent light from being transmitted through the hollow of the contact hole 89 as a principle. Therefore, according to the present modification, the alignment state of the liquid crystal molecules that form the liquid crystal layer 50 is not unnecessarily disturbed. Thus, the light leakage caused by the disturbance does not occur. It is possible to obtain the light-shielding effect due to the very presence of the filler 409a and thereby to display an image with more excellent quality.

Also, according to the present modification, it is possible to obtain another, almost the same effect caused by the electro-optical device according to the present exemplary embodiment, that is, the effect of excluding the influence of capacitance coupling between the data line 6a and the pixel electrode 9a due to the presence of the shielding layer 404.

Also, the present modification may include the characteristics of the above-mentioned second and third exemplary embodiments. That is, the contact hole 804 as well as the contact hole 89 is filled with the filler, the filler is made of the light-shielding material (the second exemplary embodiment), and the two-layer structure is formed inside the contact hole (the third exemplary embodiment). Therefore, it is possible to obtain almost the same effects as those mentioned in the corresponding parts.

Furthermore, in this aspect, since the relay electrode 719 is particularly formed, it is possible to obtain the following functions and effects. Namely, in FIG. 4, etc., it is necessary to facilitate the contact with 'the upper surface' in the drawing of the first relay layer 71 as the electrodes of the further lower layer which constitutes the storage capacitor 70 similarly to the contact hole 85 in the same figure in order to facilitate the electrical connections between the TFT 30 and the pixel electrode 9a.

However, in such a configuration, a very difficult manufacturing process for etching the precursor film must be performed with respect to the processes of forming the capacitor electrode 300 and the dielectric film 75, when etching the precursor film, while the first relay layers 71 just below the precursor film remains in an unimpaired condition. In particular, in a case wherein the high dielectric constant materials are used as the dielectric film 75 similarly to the present invention, since adverse conditions emerge that the etching is in general difficult, and the etching rate of the capacitor electrode 300 and the etching rate of the high dielectric constant materials are unbalanced, the manufacturing process is further difficult. Therefore, in this case, the probability of the so-called 'penetration' in the first relay layer 71 becomes high. If so, there are some bad cases that the short circuit may occur between the capacitor electrode 300 and the first relay layer 71 constituting the storage capacitor 70.

However, if the electrical connection between the TFT 30 and the pixel electrode 9a is realized by providing the electrical connection points at the 'lower surface' in the figure of the first relay layer 71 as this aspect, the aforementioned unbalance does not occur. The reason is that the process of having the first relay layers 71 remaining while etching the precursor film of the capacitor electrode 300 and the dielectric film 75 is not necessary in this aspect as clearly shown in FIG. 11.

According to this aspect, since the difficult etching process is not necessary as described above, it is possible to realize a good electrical connection between the first relay layer 71 and the pixel electrode 9a. The reason is that the electrical connection is implemented between the both through the relay electrode 719. In addition, for the same reason, according to this aspect, the probability that a short circuit may occur between the capacitor electrodes 300 and the first relay layers 71 becomes very low. Namely, it is possible to form non-defective storage capacitor 70 appropriately.

In addition, in this aspect, since the capacitor electrode 300 and the data line 6a are formed on the separate layers, it is not necessary to facilitate the electrical insulation between them in the same plane similarly to FIG. 2, etc. Therefore, in this aspect, the capacitor electrode 300 can be formed of the lower light-shielding film 11a, that is, the portion of the capacitor lines which extend along the direction of the "scanning lines 3a" which correspond to the aforementioned aspects. Furthermore, by doing so, in order to provide the capacitor electrodes 300 with a fixed potential, it is preferable that the capacitor lines extend outside image display regions 10a to be connected with a constant potential source. In addition, in this case, since the capacitor lines which include the capacitor electrodes 300 can be connected to the constant potential source independently and the shielding layer 404 can be also connected to the constant potential source independently, in case of employing this construction, the contact holes 801 and 803 for electrically connecting both constituents are not always necessary.

Fourth Exemplary Embodiment

Figure 12:
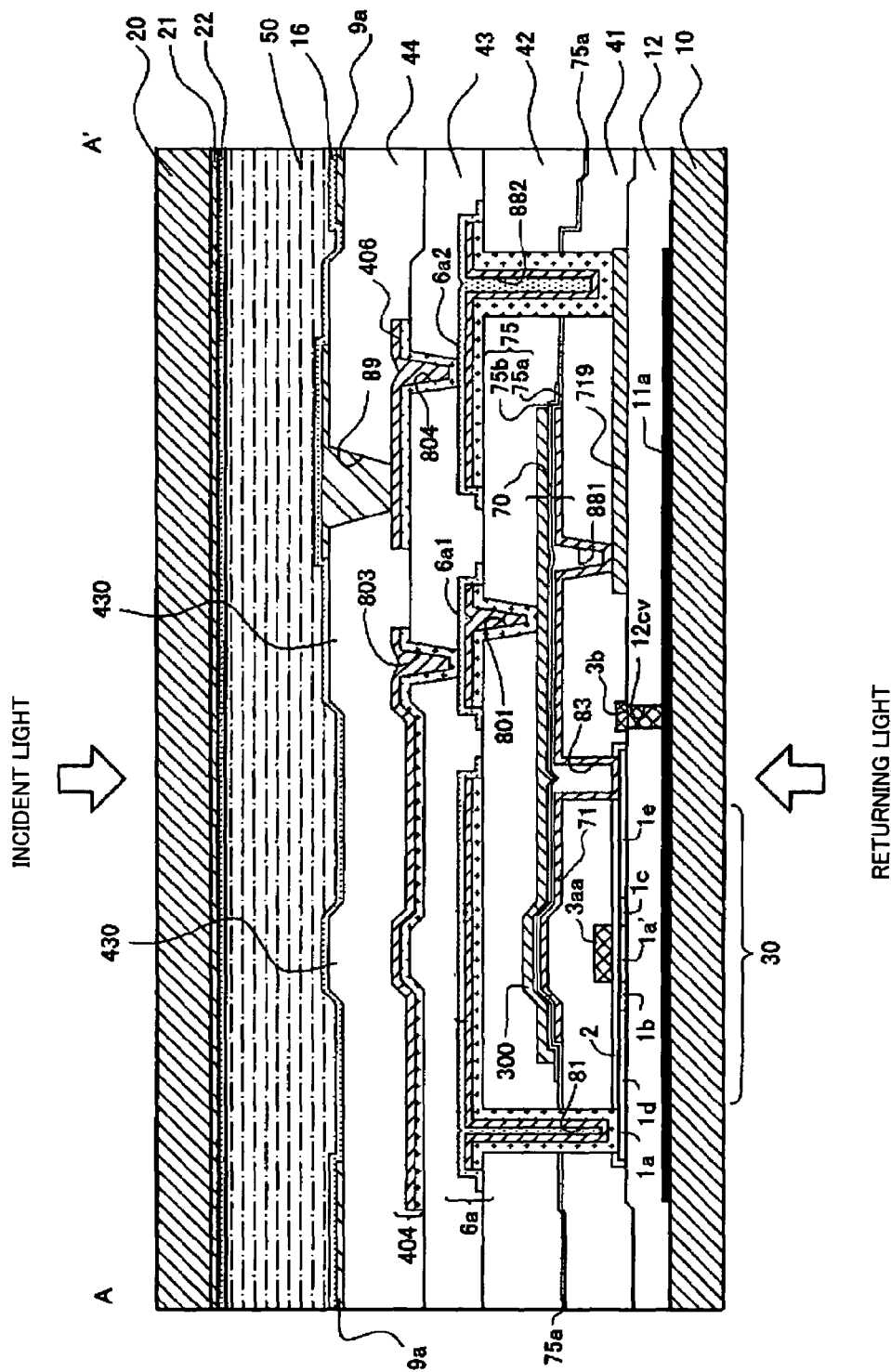
FIG. 12 has the same purpose as FIG. 11 and illustrates an aspect where a convex portion to prevent the generation of a horizontal electric field is formed.
Figure 13:
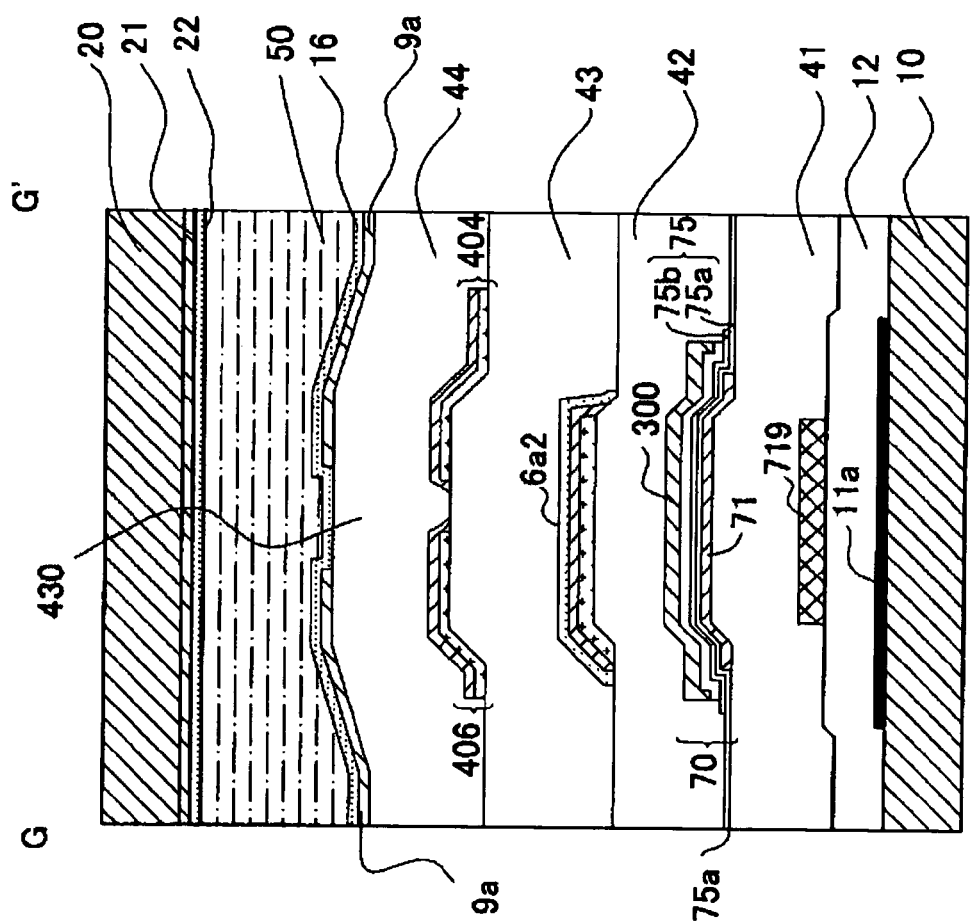
FIG. 13 is a cross-sectional view taken along the plane G-G' of FIG. 10 in a case where the convex portion to prevent the generation of the horizontal electric field is formed.

Case Where a Convex Portion is Actively Formed in the Interlayer Insulating Film Under Pixel Electrode In the following, a fourth exemplary embodiment of the present invention will be described with reference to FIGS. 12 to 14. FIG. 12 has the same purpose as FIG. 11 according to the electro-optical device of the above modification. In FIG. 12, a convex portion to prevent the generation of a horizontal electric field is formed. FIG. 13 is the cross-sectional view taken along the plane G-G' of FIG. 10 in a case where the convex portion is formed. FIG. 14 is a view for explaining a mechanism for generating the horizontal electric field.

According to the fourth exemplary embodiment, the characteristics of the surface of the fourth interlayer insulating film 44 as well as the characteristics of the filler inside the contact hole are described. That is, according to the fourth exemplary embodiment, as illustrated in FIGS. 12 and 13, a convex portion 430 is formed in the surface of the fourth interlayer insulating film 44 along the scanning line 3a. The convex portion 430 has the following effects.

Namely, in the electro-optical device similar to the exemplary embodiment, in order to reduce or prevent the deterioration of electro-optical materials due to the application of direct voltages and cross-talk or flicker in the image display, the inversion driving manner in which the polarity of the voltage applied to each of the pixel electrode 9a is inverted in accordance with a predetermined rule is generally employed. More specifically, the so-called '1H inversion driving manner' is described as follows.

Figure 14A:
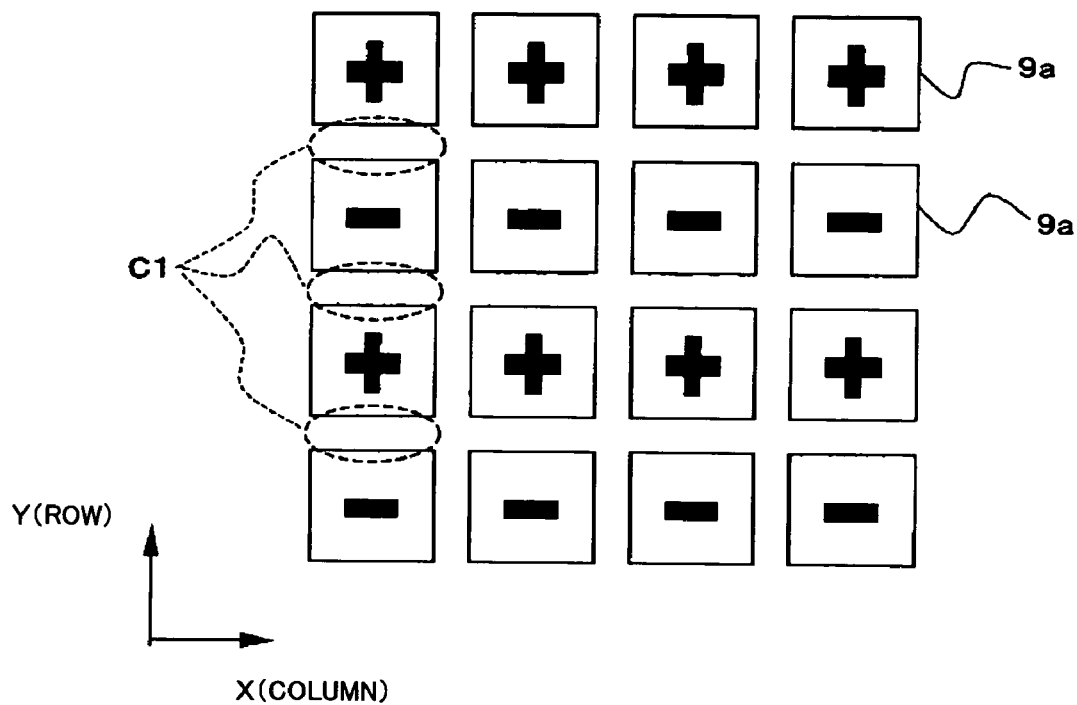
FIGS. 14(a) and 14(b) are views for explaining the generation mechanism of the horizontal electric field.
Figure 14B:
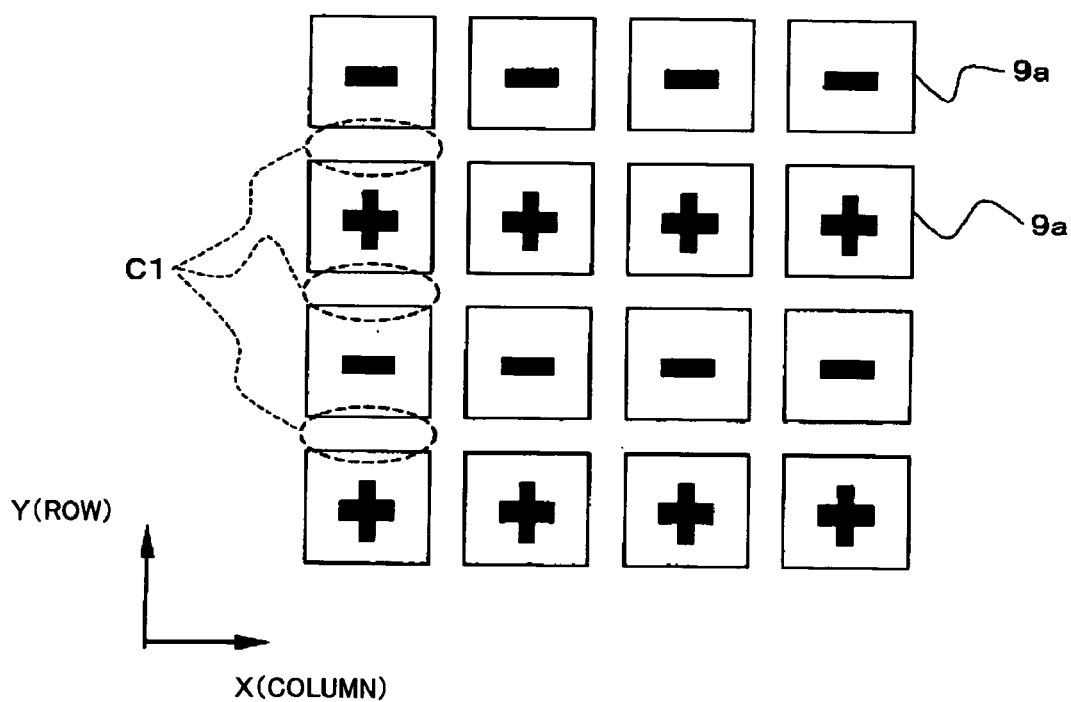

First, as shown in FIG. 14(a), during the period in which image signals of the n-th field or frame are displayed (herein, n is a natural number), the polarity of the liquid crystal driving voltage which is represented by + or − for every pixel electrode 9a is not inverted, and the pixel electrode 9a is driven with the same polarity for every row. After that, as shown in FIG. 14(b), at the time when image signal of the (n+1)th field or one frame is displayed, the voltage polarity of the liquid crystal voltage for every pixel electrode 9a is inverted. During the period in which image signals of the (n+1)th field or one frame are displayed, the polarity of the liquid crystal driving voltage which is represented by + and − for every pixel electrode 9a is not inverted, and the pixel electrodes 9a are driven with the same polarity for every row. And then, the states shown in FIG. 14(a) and FIG. 14(b) are repeated by the period of one field or one frame. Namely, this is the driving in accordance with the 1H inversion driving manner. As a result, it is possible to reduce or prevent the disorder of liquid crystal due to the application of direct voltages and simultaneously to perform the image display with reduced cross-talk or flicker. In addition, it is advantageous that there is almost no longitudinal cross-talk in comparison to the below-described 1S inversion driving manner.

However, as known in FIG. 14(a) and FIG. 14(b), in the 1H inversion driving manner, a transverse electric field is generated between the pixel electrodes 9a which are adjacent in the longitudinal direction (Y direction) in the figures. In the figures, the transverse electric field generating regions C1 are always in the vicinity of the gap between the pixel electrodes 9a which are adjacent in the Y direction. If the transverse electric field is applied, with regard to the electro-optical material wherein the longitudinal electric field (that is, for the electro-optical material to which the electric field perpendicular to the surface of the substrate) generated between the pixel electrodes and the counter electrode which face to each other is considered to be applied, the operational failure of the electro-optical material such as a disorder of the liquid crystal occurs so that the light leakage at the portions and the problem of reduction in contrast rate occur.

Although the region where the transverse electric field is generated is covered and shielded by the light-shielding films, another problem in that the opening area of the pixels is reduced in accordance with the area of the regions where the transverse electric field is generated. In particular, in accordance with the miniaturization of the pixel pitch, the distance between the adjacent pixel electrodes is further reduced and the transverse electric field increases. Therefore, these problems are getting more severe as the electro-optical devices are formed with the higher accuracy.

According to the fourth exemplary embodiment, the convex portion 430 horizontally extending in stripes is formed in the fourth interlayer insulating film 44 between pixel electrodes 9a vertically adjacent to each other as illustrated in FIG. 14, that is, between adjacent pixel electrodes 9a, to which electric potentials with reverse polarities are applied. It is possible to strengthen a vertical electric field and to weaken a horizontal electric field in a connection point between the pixel electrodes 9a disposed on the convex portion 430 due to the presence of the convex portion 430. To be specific, as illustrated in FIGS. 12 and 13, the distance between the connection point between the pixel electrodes 9a disposed on the convex portion 430 and the counter electrode 21 is reduced by the height of the convex portion 430.

Therefore, it is possible to strengthen the vertical electric field between the pixel electrodes 9a and the counter electrode 21 in a region C1 where the horizontal electric field is generated as illustrated in FIG. 14. In FIGS. 12 and 13, because the distance between the adjacent pixel electrodes 9a is uniform, the magnitude of the horizontal electric field strengthened as the distance is narrower is uniform.

Accordingly, in the transverse electric field generating regions C1 as shown FIG. 14, it is possible to reduce or prevent the alignment failure of the liquid crystal due to the transverse electric field by further dominating the longitudinal electric field. In addition, by the presence of the convex portions 430 which are made of an insulating film, since the intensity of the transverse electric field is lessened and the portions of the liquid crystal to which the transverse electric field is applied are reduced by the portions which are substituted with the convex portions 430 where the transverse electric field exists, it is possible to reduce the influence of the transverse electric field to the liquid crystal layer 50.

Figure 15:
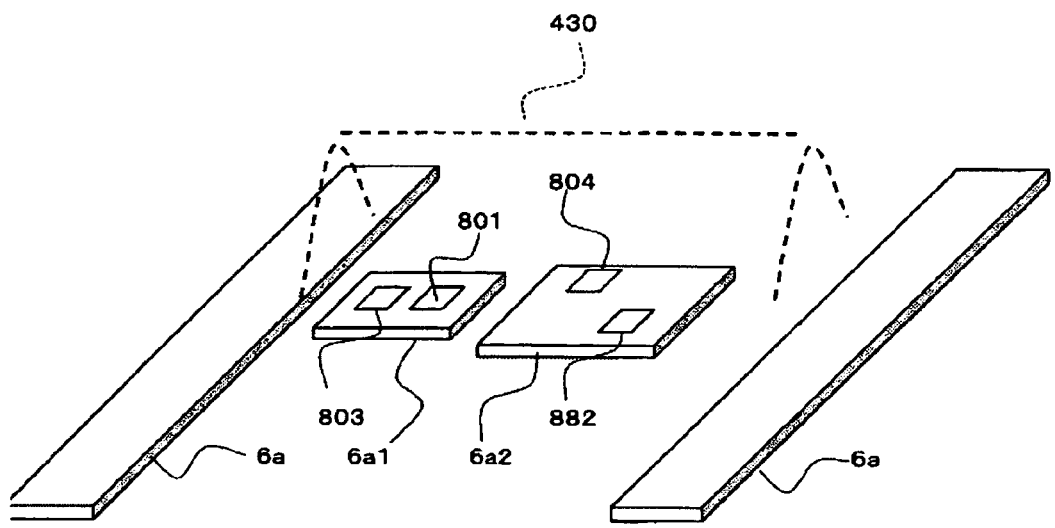
FIG. 15 is a perspective view illustrating a specific aspect to form the convex portion illustrated in FIGS. 12 and 13 (an aspect where the data lines, the relay layer used as the shielding layer, and the second relay layer are used)
Figure 16:
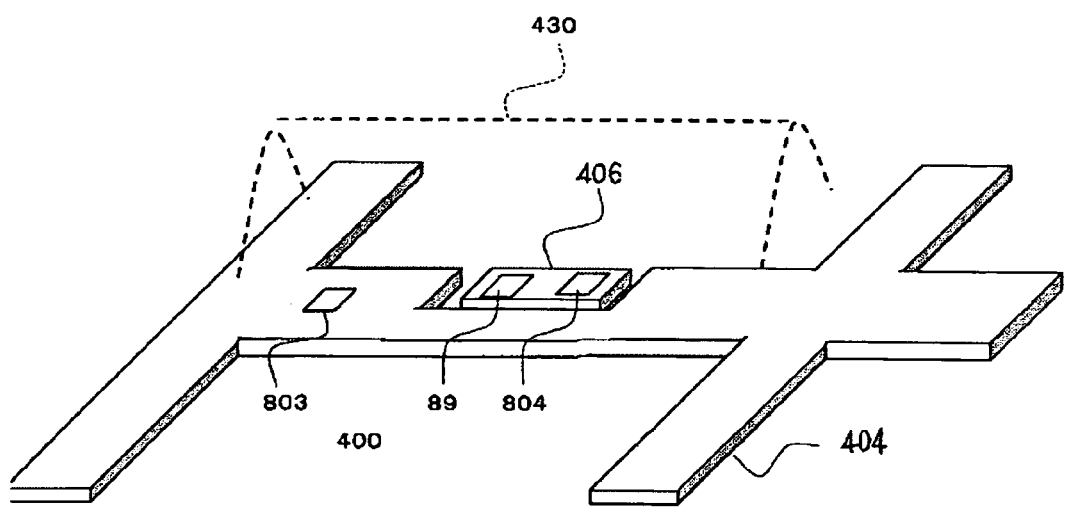
FIG. 16 is a perspective view illustrating a specific aspect to form the convex portion illustrated in FIGS. 12 and 13 (an aspect where the shielding layer and the third relay layer are used)

Also, for example, the convex portion 430 is formed as illustrated in FIGS. 15 and 16. FIG. 15 is a perspective view of the data line and the components formed in the same layer as the data line in the electro-optical device according to the second exemplary embodiment. FIG. 16 is a perspective view of the shielding layer and the components formed in the same layer as the shielding layer in the electro-optical device.

In order to form the convex portion 430, first, as illustrated in FIG. 15, the data line 6a, the relay layer 6a1 used as the shielding layer, and the second relay layer 6a2 that are formed in the electro-optical device according to the above-mentioned modification may be used. That is, as illustrated in FIG. 10, the data line 6a includes a main line portion straightly extending in the Y direction in FIG. 10. The relay layer 6a1, used as the shield layer, and the second relay layer 6a2, are formed to overhang from the data line 6a in the X direction in FIG. 10. It is possible to naturally form the convex portion 430 in the surface of the fourth interlayer insulating film 44 as the base of the pixel electrodes 9a using the data line 6a, the relay layer 6a1 used as the shielding layer, and the second relay layer 6a2 due to the heights of the data line 6a, the relay layer 6a1 used as the shielding layer, and the second relay layer 6a2 (with reference to FIG. 15). In this case, the "overhanging portion" according to the present invention corresponds to the relay layer 6a1 used as the shielding layer and the second relay layer 6a2.

Second, as illustrated in FIG. 16, the shielding layer 404 and the third relay layer 406 that are formed in the electro-optical device according to the modification may be used. That is, as illustrated in FIG. 5, the shielding layer 404 is formed latticed and the third relay layer 406 is formed of the same layer as the shielding layer 404. It is possible to naturally form the convex portion 430 in the surface of the fourth interlayer insulating film 44 as the base of the pixel electrode 9a using the shielding layer 404 and the third relay layer 406 due to the heights of the shielding layer 404 and the third relay layer 406 (with reference to FIG. 16).

In this case, the "overhanging portion" according to the present invention corresponds to the portion extending in the X direction of the shielding layer 404, which is connected to the portion extending in the Y direction in the shielding layer 404 illustrated in FIG. 5.

In the above-mentioned cases, it is preferable that the surface of the interlayer insulating film formed as the base of the data line 6a or the shielding layer 404 be appropriately planarized. By doing so, it is possible to strictly define the height of the convex portion 430. The aspect of forming the convex portion using the shielding layer or the data line can also be applied to the electro-optical device illustrated in FIGS. 2 to 4.

Furthermore, it is preferable that the step difference formed by the convex portions 430 be gentle. The "gentle" convex portions may be implemented by, for example, the processes in which the steep convex portions are formed, a planarization film is formed on the steep convex portions and the peripherals thereof, the planarization film is removed, and an etch back process in which the surfaces of the convex portions which are exposed after the removing of the planarization film is recessed is performed.

If the "gentle" convex portions are provided, the rubbing process on the alignment film 16 can be relatively easily and excellently performed without non-uniformity, so that it is possible to effectively reduce or prevent the operational failures of the electro-optical materials, such as the disorder of the liquid crystal in advance. That is a difference from the case that the corner of the surface of the convex portions varies steeply. In this case, the discontinuous planes occur in the electro-optical materials such as liquid crystal, etc., and the operational failures of the electro-optical materials such as a disorder of liquid crystal, etc. occur.

In addition, although the aforementioned case is described as to the 1H inversion driving manner, the present invention is not limited to such a driving manner. For example, the present invention may be also adapted to the 1S inversion driving manner in which, while the pixel electrodes in the same column are driven with the potential of the same polarity, the voltage polarity is inverted at the frame or field period for every column, although this manner is used as an inversion driving manner that can be relatively easily controlled and display high quality of images. In addition, the present invention may be also adapted to the recently developed dot inversion driving manner in which the polarity of the voltage applied to each of the pixel electrodes is inverted between the pixel electrodes which are adjacent to the bi-directions, that is, the column and row directions.

Fifth Exemplary Embodiment

Multiplication Speed Field Inversion Driving

Figure 17:
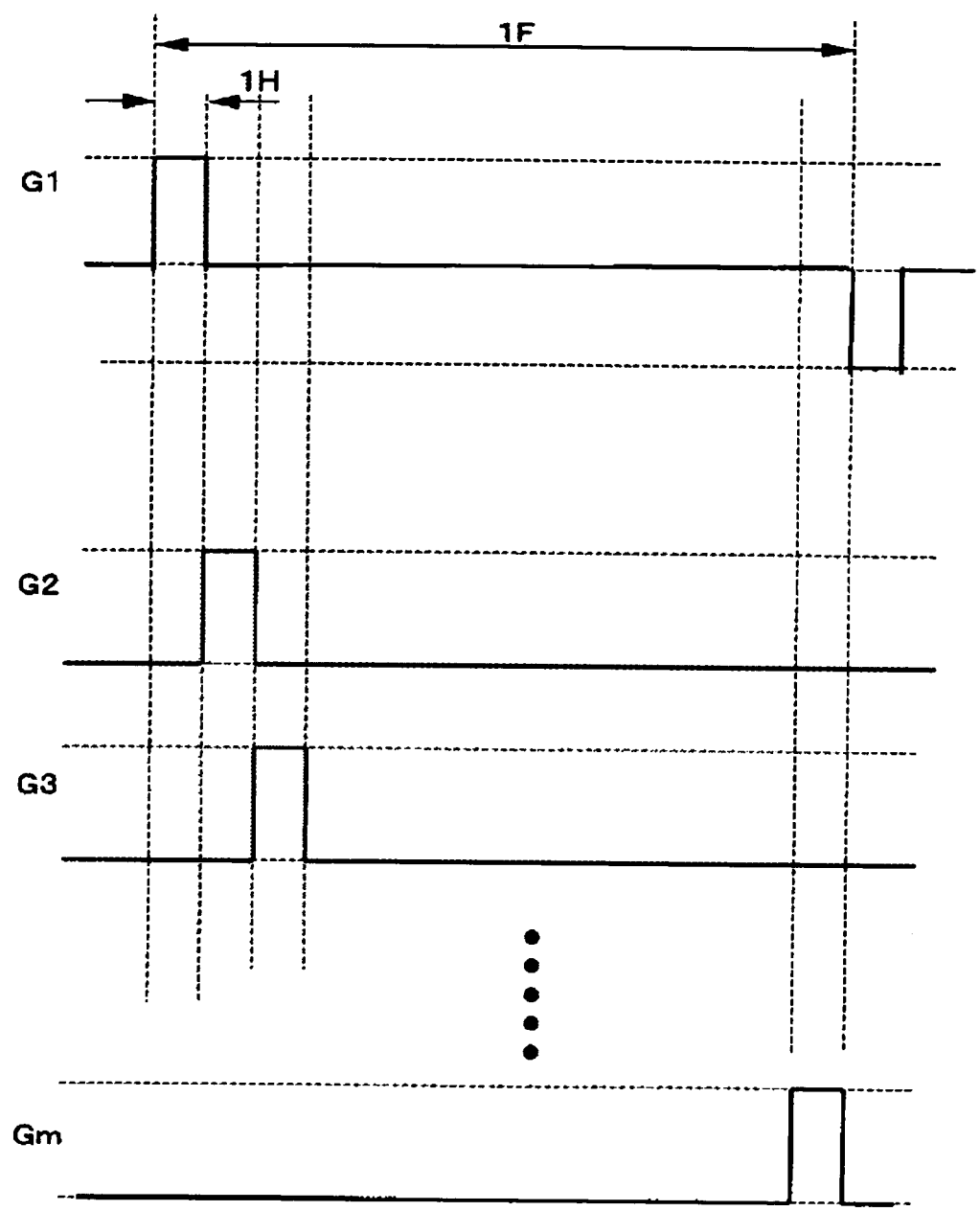
FIG. 17 is a timing chart illustrating a method of applying voltage to the pixel electrodes according to the related art.
Figure 18:
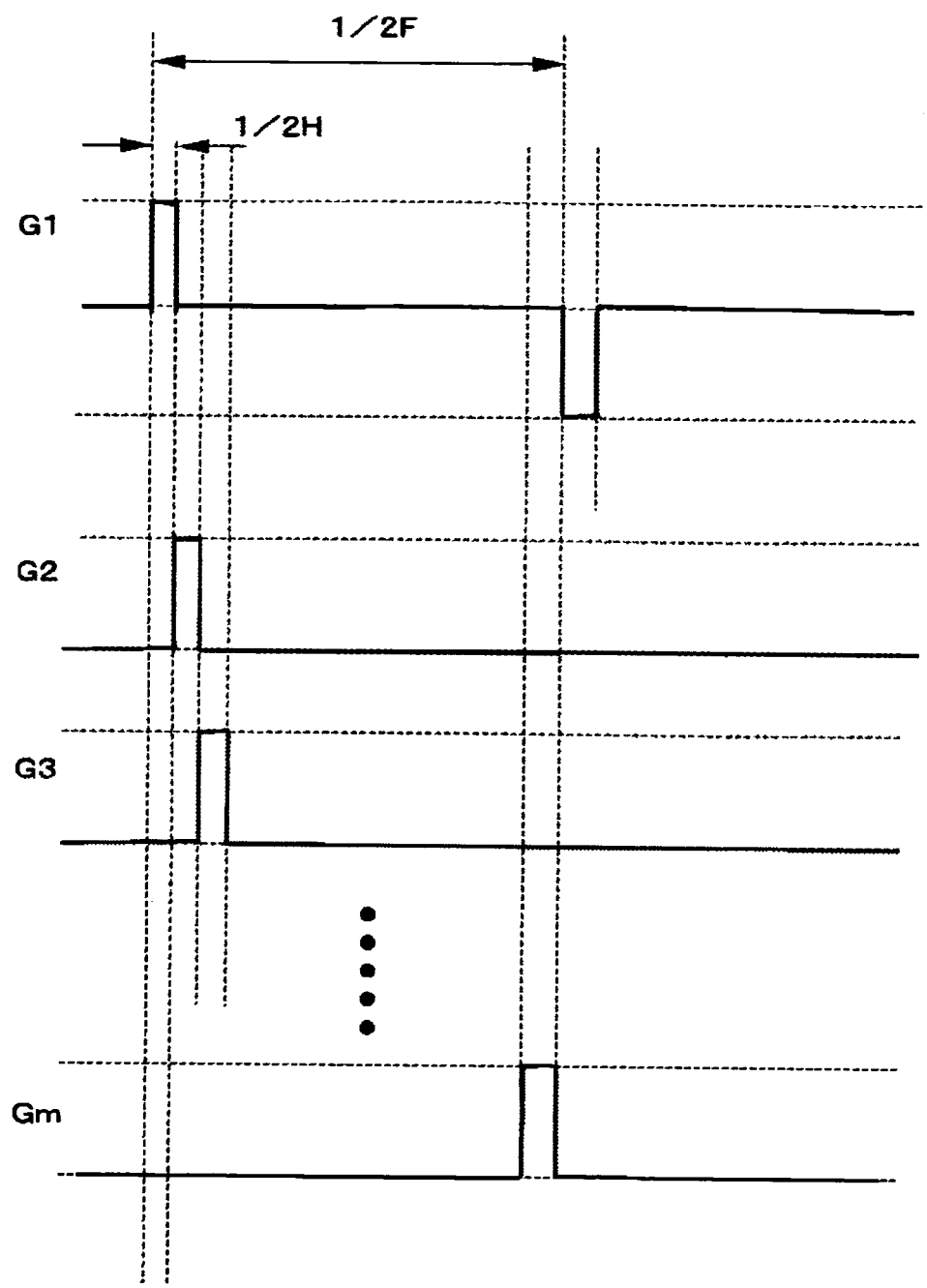
FIG. 18 is a timing chart illustrating a method of applying voltage to the pixel electrodes according to the fifth exemplary embodiment of the present invention.

A fifth exemplary embodiment according to the present invention will now be described with reference to FIGS. 17 and 18. FIG. 17 is a timing chart of a scanning signal, which illustrates a related art method of applying voltage to the pixel electrode 9a. FIG. 18 is a timing chart according to the fifth exemplary embodiment. Further, the pixel portion described with reference to FIGS. 1 to 4 is "driven" on the basis of such timing charts.

According to the fifth exemplary embodiment, the characteristics of the method of driving the pixel electrode 9a are described. In particular, the unique effects of the method are obtained in case where the surface of the interlayer insulating film under the pixel electrode 9a is planarized according to the present exemplary embodiment.

The method of applying voltage to the pixel electrode 9a according to the fifth exemplary embodiment will now be simply described using the timing chart illustrated in FIG. 17. As illustrated in FIG. 17, the scanning lines 3a from the first row to the last row, to which the scanning signals G1, G2, . . . , and Gm are sequentially applied, are selected (with reference to FIG. 1). Here, the "selection" means that electricity can be turned on in the TFTs 30 connected to the scanning lines 3a. In a period (a horizontal scanning period (1H)) when the scanning lines 3a of the respective rows are selected, the image signals S1, S2, . . . , and Sn are sent to the TFTs 30, further, to the pixel electrodes 9a through the data lines 6a (which is not illustrated in FIG. 17). Therefore, each pixel electrode 9a has a predetermined electric potential. As a result, a predetermined electric potential difference is generated between the electric potential of each pixel electrode and the electric potential of the counter electrode 21. That is, predetermined charges are charged to the liquid crystal layer 50.

Furthermore, the period when all of the scanning lines 3a from the first row to the last row are selected is referred to as a one field period or a one vertical scanning period (1F). Also, according to the driving method, driving with inversed polarities is performed between the nth field and the (n+1)th field ("1V inversion driving" is mentioned hereinafter (with reference to G1 of FIGS. 17 and 18)).

According to the 1 V inversion driving, unlike the above-mentioned 1 H inversion driving, because the adjacent pixel electrodes 9a are not driven in the electric field with different polarities, as a principle, the horizontal electric field is not generated. Therefore, according to the present exemplary embodiment, even if the surface of the interlayer insulating film under the pixel electrode 9a is planarized, it is not necessary to consider the inconveniences caused by the generation of the horizontal electric field, for example, similarly to preparing the convex portion.

However, when the above-mentioned 1V inversion driving is adopted, the following problems occur. Whenever the polarity is inverted, that is, for every one vertical scanning period, flicker is generated on the image.

In this case, the Multiplication Speed field inversion driving as illustrated in FIG. 18 is preferably performed. The Multiplication Speed field inversion driving is a driving method of reducing one field period to a half, compared to that of the related art (For example, when the pixel electrodes are driven at 120 Hz according to the conventional art, the "half" is preferably no more than 1/60 s). Therefore, according to the 1V inversion driving, the period of the polarity inversion is half of that of the related art. When FIG. 18 is compared with FIG. 17, the former is shorter than the latter by the one horizontal scanning period 1H. Therefore, the one vertical scanning period 1F becomes shorter. To be specific, as illustrated in FIG. 18, the one vertical scanning period 1F is reduced to "½".

By doing so, the one vertical scanning period is reduced. That is, the screen caused by the plus polarity and the screen caused by the minus polarity are swiftly exchanged. Therefore, the flicker does not appear.

As mentioned above, according to the Multiplication Speed field inversion driving method, it is possible to display an image with excellent quality without the flicker.

Also, according to the Multiplication Speed field inversion driving method, it is possible to improve the electric potential holding characteristic of the respective pixel electrode 9a compared with cases where other driving methods are used. This is because that the length of the one field period is reduced to half refers to the time when the pixel electrodes 9a must hold predetermined electric potential is reduced to half of that of the related art. According to the present exemplary embodiment, the high performance storage capacitor 70 is included in each pixel. Therefore, it is possible to reduce or prevent the attenuation of voltage during the field period. The effect of improving the relative electric potential holding characteristic undoubtedly serves for the object of displaying the image with further excellent quality. The effect of the fifth exemplary embodiment is the same as the effects of the first to fourth exemplary embodiments.

Entire Structure of Electro-Optical Device

The whole construction of the electro-optical device for each of the exemplary embodiments will be described with reference to FIGS. 19 and 20. In addition, FIG. 19 is a plan view illustrating the TFT array substrate in the electro-optical device of the exemplary embodiment according to the present invention and the constituents formed thereon as viewed from the counter substrate 20 side, and FIG. 20 is a cross sectional view along the plane H-H' in FIG. 19.

Figure 19:
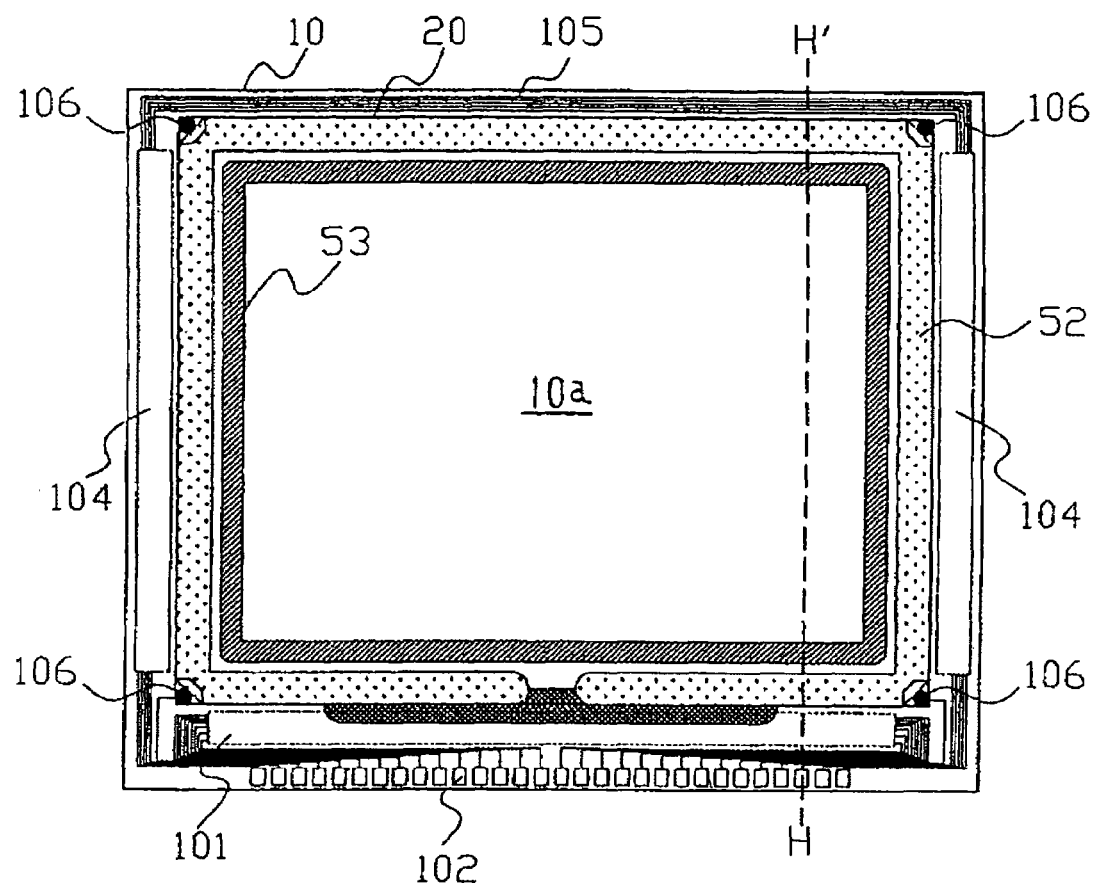
FIG. 19 is a plan view illustrating a TFT array substrate in the electro-optical device according to the exemplary embodiments of the present invention together with the elements formed on the substrate as viewed from the counter substrate.
Figure 20:
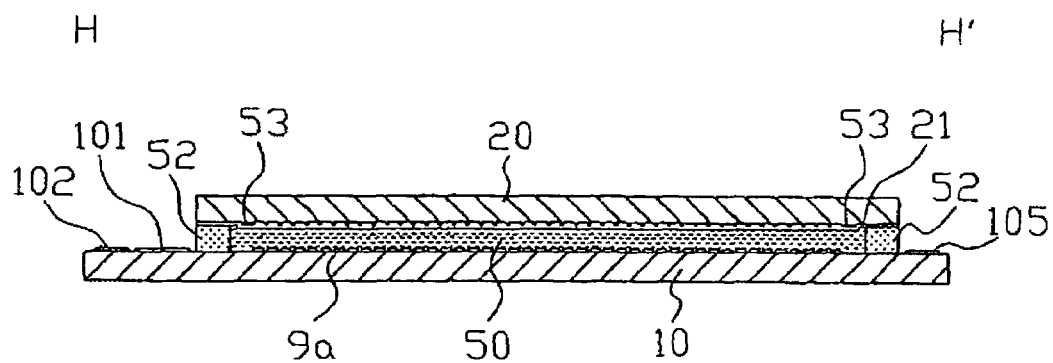
FIG. 20 is a cross-sectional view taken along the plane H-H' of FIG. 19.

In FIGS. 19 and 20, with regard to the electro-optical device according to the present invention, the TFT array substrate 10 and the counter substrate 20 are provided to face each other. Between the TFT array substrate 10 and the counter substrate 20, liquid crystals 50 are sealed, and the TFT array substrate 10 and the counter substrate 20 are attached to each other with sealing materials 52 which are provided at the sealing regions located in the periphery of the image display regions 10a.

The sealing materials 52 are made of, for example, an ultra-violet curing resin or a thermo setting resin for attaching both substrates to each other and are cured by ultra-violet irradiation or heating, etc. Furthermore, among the sealing materials 52, gap materials (spacers), such as glass fibers or glass beads may be dispersed in order to keep the distance (the gap between the substrates) between both substrates in a predetermined value if the liquid crystal device in the exemplary embodiments is a small liquid crystal device with a function of displaying enlarged images such as a projector. In addition, the gap materials may be included in the liquid crystal layer 50 if the liquid crystal device is a large liquid crystal device with function of displaying images in the equal magnification power.

In the outside regions of the sealing materials 52, a data line driving circuit 101 which drives the data lines 6a by supplying the image signals to the data lines 6a at a predetermined timing and an external circuit connection terminals 102 are provided along the one side of the TFT array substrate 10, and scanning line driving circuits 104 which drive the scanning lines 3a by supplying the scanning signals to the scanning lines 3a at a predetermined timing are provided along the two sides which are adjacent to the one side.

In addition, as long as the delay of the scanning signals supplied to the scanning lines 3a is not considered to be a problem, the scanning line driving circuits 104 may be also provided at the only one side. Furthermore, the data line driving circuit 101 may be provided at both sides along the one side of the image display regions 10a.

In the other side of the TFT array substrate 10, a plurality of wiring lines 105 are provided to connect the scanning line driving circuits 104 which are provided at both sides of the image display regions 10a.

Furthermore, in at least one position of the corner portions of the counter substrate 20, a conductive material 106 is provided to perform electrical conduction between the TFT array substrate 10 and the counter substrate 20.

In FIG. 20, on the TFT array substrate 10, alignment films are provided over the pixel switching TFTs or the pixel electrodes 9a after forming the wiring lines, such as scanning lines, data lines, or the like. On the other hand, on the counter substrate 20, alignment films as well as the counter electrode 21 are provided on portions of the uppermost layer. Furthermore, the liquid crystal layer 50 includes, for example, one type liquid crystal or a mixture of various types of nematic liquid crystals, and take predetermined states between a pair of the alignment films.

In addition, on the TFT array substrate 10, a sampling circuit to apply the image signals to the plurality of the data lines 6a in a predetermined timing, a precharge circuit to supply precharge signals of a predetermined voltage level to the plurality of the data lines 6a in advance of the image signals, and a test circuit to check the quality, defects, etc., of the electro-optical device during the manufacturing stage or at the shipment stage in addition to the data line driving circuit 101, the scanning line driving circuits 104, etc., may be provided.

Electronic Apparatus

Next, with regard to an exemplary embodiment of a projection type color display device as an example of the electronic apparatus for which the electro-optical device described above in details is used as a light valve, the whole construction, and particularly the optical construction will be described. Herein, FIG. 21 is a schematic cross sectional view of the projection type color display device.

Figure 21:
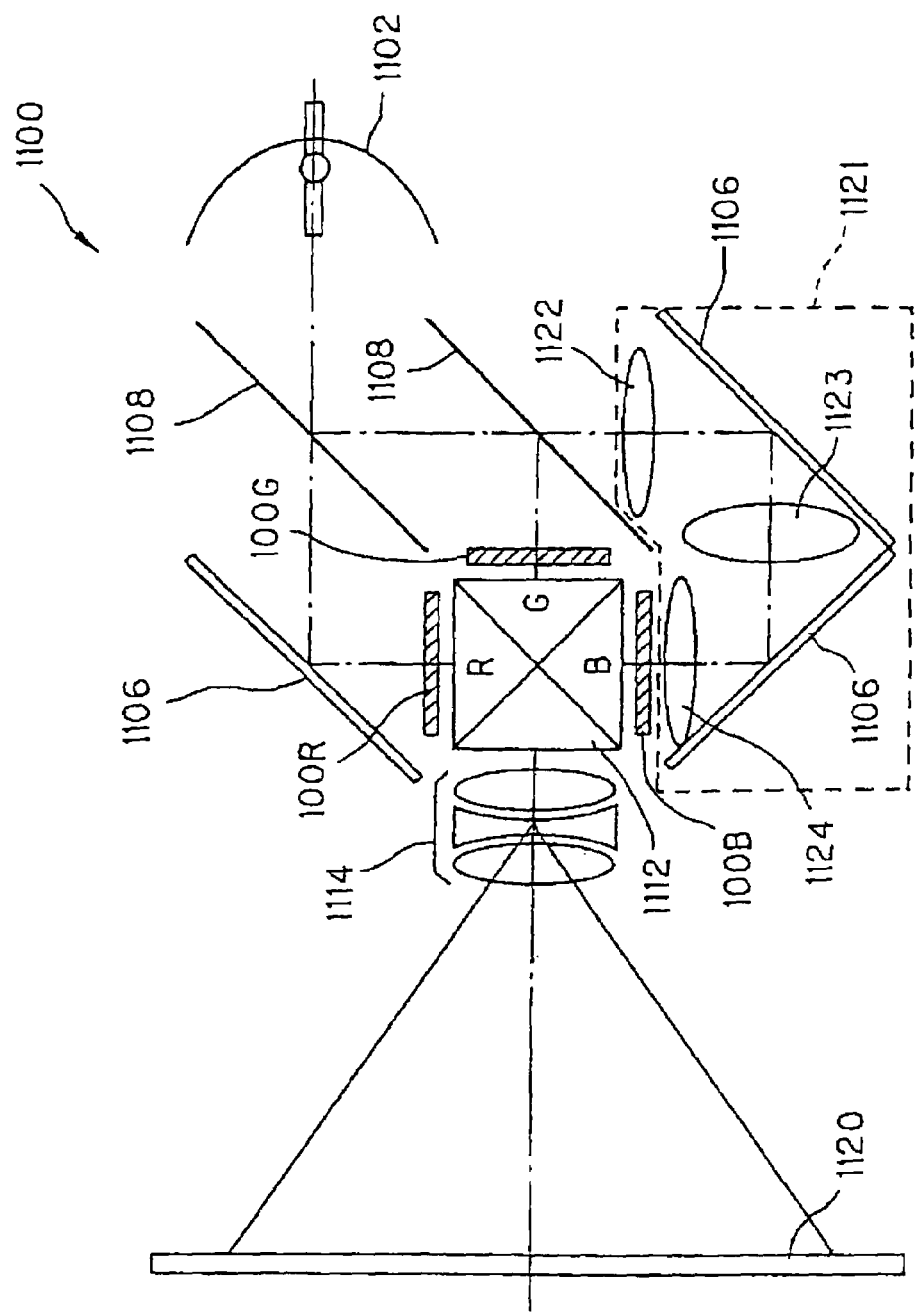
FIG. 21 is a schematic cross-sectional view illustrating a color liquid crystal projector that is an example of a projection type color display device that is an exemplary embodiment of the electronic apparatus according to the present invention.

In FIG. 21, the liquid crystal projector 1100 as an example of the projection type color display device according to the exemplary embodiment is provided with three liquid crystal modules which include liquid crystal devices in which driving circuits are mounted on the TFT array substrate, and is constructed as a projector which is used as RGB light valves 100R, 100G, and 100B, respectively. In the liquid crystal projector 1100, when the projection light is emitted from the lamp unit 1102 of a white light source such as a metal halide lamp, etc., the light is divided into light components R, G, and B corresponding to the three primary colors of RGB by three pieces of mirrors 1006 and two pieces of dichroic mirrors 1108, and then guided to the light values 100R, 100G, and 100B corresponding to each color.

At this time, in particular, the B light is guided through relay lens system 1121 which include an incident lens 1122, a relay lens 1123, and an emitting lens 1124 in order to reduce or prevent light leakage due to long light paths. In addition, the light components corresponding to the three primary colors which are modulated by the light valves 100R, 100G, and 100G, respectively, are combined again by a dichroic prism 1112, and then projected as a color image on a screen 1120 through the projection lens 1114.

The present invention is not limited to the aforementioned exemplary embodiments, and can be appropriately modified without departing from the principle or sprit of the invention drawn out from the claims and the whole specification, and any electro-optical device and electronic apparatus involved in the modifications are also included into the technical scope of the present invention. The electro-optical device can be adapted to an electrophoresis device, an electroluminescent device, or a device using electron emitting elements (a field emission display and a surface-conduction electron-emitter display).

What is claimed is:

1. An electro-optical device comprising:
   a first substrate;
   a second substrate;
   a liquid crystal layer disposed between the first and second substrates;
   a data line extending in a first direction;
   a scanning line extending in a second direction and intersecting the data line;
   a pixel electrode and switching element disposed so as to correspond to an intersection region of the data line and the scanning line, the pixel electrode being formed from an transparent material;
   a storage capacitor electrically connected to the switching element and the pixel electrode;
   a light shielding layer disposed between the data line and the pixel electrode;
   an interlayer insulating film disposed as the base of the pixel electrode;
   a contact hole formed in the interlayer insulating film;
   a coating member coating an inner side wall of the contact hole, the coating member being made from a light shielding and electrically conductive material, the coating member being contained completely within the contact hole;
   a filler completely filling an inner space within the coating member, the filler being made from a transparent material and having a substantially planar upper surface in direct contact with the liquid crystal layer; and
   a relay layer formed below the interlayer insulating film and electrically connecting the pixel electrode to the switching element, the relay layer having a two-layered structure including two metal layers.

2. The electro-optical device according to claim 1, the surface of the interlayer insulating film being planarized.

3. The electro-optical device according to claim 2, the plurality of pixel electrodes being disposed in a plane and including a first pixel electrode group inversely driven in a first period and a second pixel electrode group inversely driven in a second period complementary to the first period,
   the data lines including main line portions which extend above the scanning lines so as to intersect the scanning lines and overhanging portions which overhang from the main line portions along the scanning lines,
   a counter electrode facing the plurality of pixel electrodes being formed on a counter substrate disposed to face the substrate, and
   convex portions being formed in regions which are to be gaps between the pixel electrodes adjacent to each other by interposing the scanning lines in plan view due to the presence of the overhanging portions on the base surfaces of the pixel electrodes on the substrate,
   the overhanging portions including a shielding layer, and
   the convex portions including an insulating film.

4. The electro-optical device according to claim 2, the plurality of pixel electrodes being disposed in a plane and including a first pixel electrode group inversely driven in a first period and a second pixel electrode group inversely driven in a second period complementary to the first period,
   a counter electrode facing the plurality of pixel electrodes and convex portions formed in regions which are to be gaps between the pixel electrodes adjacent to each other in plan view are formed on a counter substrate disposed to face the substrate, and
   the convex portions have gentle surface step differences caused by removing the planarized films formed on the convex portions by an etching process and causing the surface of the convex portion exposed after removing the planarized films to recede.

5. The electro-optical device according to claim 1, another contact hole being formed in another interlayer insulating film, and
   the entire region inside the other contact hole being filled with the filler.

6. The electro-optical device according to claim 1, the filler being made of a transparent conductive material.

7. The electro-optical device according to claim 1, the filler being formed on the coating member.

8. The electro-optical device according to claim 1, the contact hole being formed in light-shielding regions corresponding to a position in which the scanning line and the data line is formed.

9. The electro-optical device according to claim 1, the data line being formed of the same film as one of a pair of electrodes constituting the storage capacitor.

10. The electro-optical device according to claim 9,
    the data line being a laminated structure of an aluminum film and a conductive polysilicon film.

11. The electro-optical device according to claim 1, further comprising a relay layer being electrically connected between one of the pair of electrodes constituting the storage capacitor and the pixel electrode.

12. The electro-optical device according to claim 1, one of the metal layers of the relay layer being formed from a light-absorbing material and the other of the metal layers being formed from a light-reflecting material.

13. An electro-optical device comprising:
    a first substrate;
    a second substrate;
    a liquid crystal layer disposed between the first and second substrates;
    a data line extending in a first direction;
    a scanning line extending in a second direction and intersecting the data line;
    a pixel electrode and a switching element disposed so as to correspond to intersection regions of the data line and the scanning line, the pixel electrode being formed from a transparent material;
    a storage capacitor electrically connected to the switching element and the pixel electrode;
    a light shielding layer disposed between the data line and the pixel electrode;
    an interlayer insulating film disposed as the base of the pixel electrode;

a contact hole formed in the interlayer insulating film;

a coating member coating an inner side wall of the contact hole, the coating member being made from a light shielding and electrically conductive material, the coating member being contained completely within the contact hole;

a filler completely filling an inner space within the coating member, the filler being made from a transparent material and having a substantially planar upper surface in direct contact with the liquid crystal layer; and a relay layer formed below the interlayer insulating film and electrically connecting the pixel electrode to the switching element, the relay layer having a two-layered structure including two metal layers, one of the metal layers of the relay layer being formed from a light-absorbing material and the other of the metal layers being formed from a light-reflecting material, and the surface of the interlayer insulating film being planarized.

14. An electronic apparatus with an electro-optical device, the electro-optical device comprising:

a first substrate;

a second substrate;

a liquid crystal layer disposed between the first and second substrates;

a data line extending in a first direction;

a scanning line extending in a second direction and intersecting the data line;

a pixel electrode and a switching element disposed so as to correspond to intersection regions of the data line and the scanning line, the pixel electrode being formed from a transparent material;

a storage capacitor electrically connected to the switching element and the pixel electrode;

a shielding layer disposed between the data line and the pixel electrode;

an interlayer insulating film disposed as the base of the pixel electrode;

a contact hole formed in the interlayer insulating film;

a coating member coating an inner side wall of the contact hole, the coating member being made from a light shielding and electrically conductive material, the coating member being contained completely within the contact hole;

a filler completely filling an inner space within the coating member, the filler being made from a transparent material and having a substantially planar upper surface in direct contact with the liquid crystal layer; and a relay layer formed below the interlayer insulating film and electrically connecting the pixel electrode to the switching element, the relay layer having a two-layered structure including two metal layers.

* * * * *